(12) United States Patent
Lu et al.

(10) Patent No.: US 10,636,340 B2
(45) Date of Patent: Apr. 28, 2020

(54) DISPLAY WITH GAZE-ADAPTIVE RESOLUTION ENHANCEMENT

(71) Applicant: Facebook Technologies, LLC, Menlo Park, CA (US)

(72) Inventors: Lu Lu, Kirkland, WA (US); Fenglin Peng, Kirkland, WA (US); Michael Sean Mounier, Redmond, WA (US); Kevin James MacKenzie, Sammamish, WA (US); Wai Sze Tiffany Lam, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/054,962

(22) Filed: Aug. 3, 2018

(65) Prior Publication Data
US 2019/0318677 A1    Oct. 17, 2019

Related U.S. Application Data

(60) Provisional application No. 62/658,522, filed on Apr. 16, 2018.

(51) Int. Cl.
| | | |
|---|---|---|
| *G09G 3/00* | (2006.01) | |
| *G02B 27/26* | (2006.01) | |
| *G02B 27/01* | (2006.01) | |
| *G09G 3/36* | (2006.01) | |
| *G06F 3/01* | (2006.01) | |
| *G02B 30/25* | (2020.01) | |

(52) U.S. Cl.
CPC ......... *G09G 3/007* (2013.01); *G02B 27/0101* (2013.01); *G02B 30/25* (2020.01); *G06F 3/013* (2013.01); *G09G 3/3611* (2013.01)

(58) Field of Classification Search
CPC .. G09G 3/007; G09G 3/3611; G02B 27/0101; G02B 27/26; G06F 3/013
See application file for complete search history.

(56) References Cited

U.S. PATENT DOCUMENTS

| | | | |
|---|---|---|---|
| 6,061,103 A | 5/2000 | Okamura et al. | |
| 8,705,177 B1 * | 4/2014 | Miao | G02B 27/0172 359/630 |
| 8,872,869 B2 * | 10/2014 | Damera-Venkata | G09G 3/007 345/629 |
| 9,335,548 B1 * | 5/2016 | Cakmakci | G02B 27/0172 |
| 9,640,120 B2 | 5/2017 | Petrov | |
| 9,989,765 B2 * | 6/2018 | Jepsen | G06F 3/0346 |

(Continued)

FOREIGN PATENT DOCUMENTS

EP    1558043 A1    7/2005

*Primary Examiner* — Nitin Patel
*Assistant Examiner* — Amy Onyekaba
(74) *Attorney, Agent, or Firm* — Matthew A. Pequignot; Evan J. Newman

(57) ABSTRACT

A display apparatus includes a pixelated display, an eye tracking system, and a segmented resolution enhancing device coupled to the eye tracking system and operable to selectively enhance effective image resolution for the electronic display in the gaze direction. The segmented resolution enhancing device may include a polarization switch in series with a polarization gratings, at least one of which is segmented, for shifting image pixels in the gaze direction between offset positions while displaying a frame.

18 Claims, 18 Drawing Sheets

(56) References Cited

U.S. PATENT DOCUMENTS

| | | | | |
|---|---|---|---|---|
| 10,078,922 B2* | 9/2018 | Patel | | G09G 5/373 |
| 10,082,870 B2* | 9/2018 | Thunstrom | | G06F 3/013 |
| 10,168,531 B1* | 1/2019 | Trail | | G02B 5/18 |
| 10,248,198 B1* | 4/2019 | Kim | | G06F 3/013 |
| 10,303,251 B1* | 5/2019 | Kim | | G06F 3/013 |
| 2003/0169247 A1* | 9/2003 | Kawabe | | G09G 3/342 |
| | | | | 345/204 |
| 2004/0108971 A1 | 6/2004 | Waldern et al. | | |
| 2006/0268207 A1 | 11/2006 | Tan et al. | | |
| 2007/0291227 A1* | 12/2007 | Yang | | G06T 7/20 |
| | | | | 351/210 |
| 2008/0030527 A1 | 2/2008 | Kenji et al. | | |
| 2008/0068402 A1* | 3/2008 | Ioka | | G09G 3/2088 |
| | | | | 345/660 |
| 2010/0056274 A1* | 3/2010 | Uusitalo | | G02B 27/017 |
| | | | | 463/31 |
| 2010/0103077 A1* | 4/2010 | Sugiyama | | G02B 27/017 |
| | | | | 345/8 |
| 2011/0228975 A1* | 9/2011 | Hennessey | | A61B 3/113 |
| | | | | 382/103 |
| 2012/0218481 A1* | 8/2012 | Popovich | | G02B 5/1819 |
| | | | | 349/11 |
| 2012/0268451 A1* | 10/2012 | Tsai | | G02B 27/2214 |
| | | | | 345/419 |
| 2013/0286168 A1* | 10/2013 | Park | | G09G 3/003 |
| | | | | 348/54 |
| 2013/0329021 A1* | 12/2013 | Fidler | | G02B 26/04 |
| | | | | 348/54 |
| 2014/0247277 A1* | 9/2014 | Guenter | | G06T 11/40 |
| | | | | 345/611 |
| 2014/0292749 A1* | 10/2014 | Vaganov | | B44D 2/002 |
| | | | | 345/419 |
| 2015/0009130 A1* | 1/2015 | Motta | | G06F 3/012 |
| | | | | 345/156 |
| 2015/0205182 A1* | 7/2015 | Leister | | G02B 5/3083 |
| | | | | 349/201 |
| 2015/0262010 A1* | 9/2015 | Kuldkepp | | G06K 9/00604 |
| | | | | 382/103 |
| 2015/0264299 A1* | 9/2015 | Leech | | H04N 21/6587 |
| | | | | 348/78 |
| 2015/0323990 A1* | 11/2015 | Maltz | | G02B 27/0179 |
| | | | | 345/173 |
| 2016/0004306 A1* | 1/2016 | Maltz | | G06F 3/013 |
| | | | | 345/173 |
| 2016/0124233 A1* | 5/2016 | Wei | | G02B 27/22 |
| | | | | 349/126 |
| 2016/0267716 A1* | 9/2016 | Patel | | G09G 5/395 |
| 2016/0343315 A1* | 11/2016 | Richards | | G09G 3/20 |
| 2017/0018232 A1* | 1/2017 | Nicholson | | G09G 3/002 |
| 2017/0038590 A1* | 2/2017 | Jepsen | | G02B 3/0056 |
| 2017/0039906 A1* | 2/2017 | Jepsen | | G02F 1/13306 |
| 2017/0059960 A1* | 3/2017 | Shi | | G02B 27/0101 |
| 2017/0061838 A1* | 3/2017 | Shi | | G02B 5/30 |
| 2017/0068091 A1* | 3/2017 | Greenberg | | G06F 3/013 |
| 2017/0115519 A1* | 4/2017 | Shi | | G02F 1/13306 |
| 2017/0176753 A1* | 6/2017 | Shi | | G02F 1/1362 |
| 2017/0192499 A1* | 7/2017 | Trail | | G06F 3/013 |
| 2017/0255015 A1* | 9/2017 | Geng | | G02B 6/0008 |
| 2017/0270637 A1 | 9/2017 | Perreault et al. | | |
| 2017/0287446 A1* | 10/2017 | Young | | G09G 5/391 |
| 2017/0299689 A1 | 10/2017 | Va et al. | | |
| 2017/0308161 A1* | 10/2017 | Richards | | G09G 3/3406 |
| 2017/0309057 A1* | 10/2017 | Vaganov | | H04N 13/30 |
| 2017/0373459 A1 | 12/2017 | Weng et al. | | |
| 2018/0059420 A1* | 3/2018 | Woo | | G02B 27/0172 |
| 2018/0081434 A1* | 3/2018 | Siddiqui | | H04N 13/383 |
| 2018/0090078 A1* | 3/2018 | Chang | | G06F 3/013 |
| 2018/0158390 A1* | 6/2018 | Sanglimsuwan | | G09G 3/003 |
| 2018/0173303 A1* | 6/2018 | Liu | | G02B 27/0025 |
| 2018/0182307 A1* | 6/2018 | Tseng | | G06F 3/011 |
| 2018/0192058 A1* | 7/2018 | Chen | | G06T 11/60 |
| 2018/0239423 A1* | 8/2018 | Mardanbegi | | A61B 3/113 |
| 2018/0260024 A1* | 9/2018 | Maltz | | G06F 3/013 |
| 2018/0284464 A1* | 10/2018 | Lu | | G02F 1/29 |
| 2018/0322845 A1* | 11/2018 | Machida | | G02B 26/026 |
| 2019/0101980 A1* | 4/2019 | Stafford | | G02C 11/10 |
| 2019/0122642 A1* | 4/2019 | Morein | | G09G 5/391 |
| 2019/0212828 A1* | 7/2019 | Kin | | G02B 27/017 |
| 2019/0227492 A1* | 7/2019 | Kroll | | G02B 5/1833 |

* cited by examiner

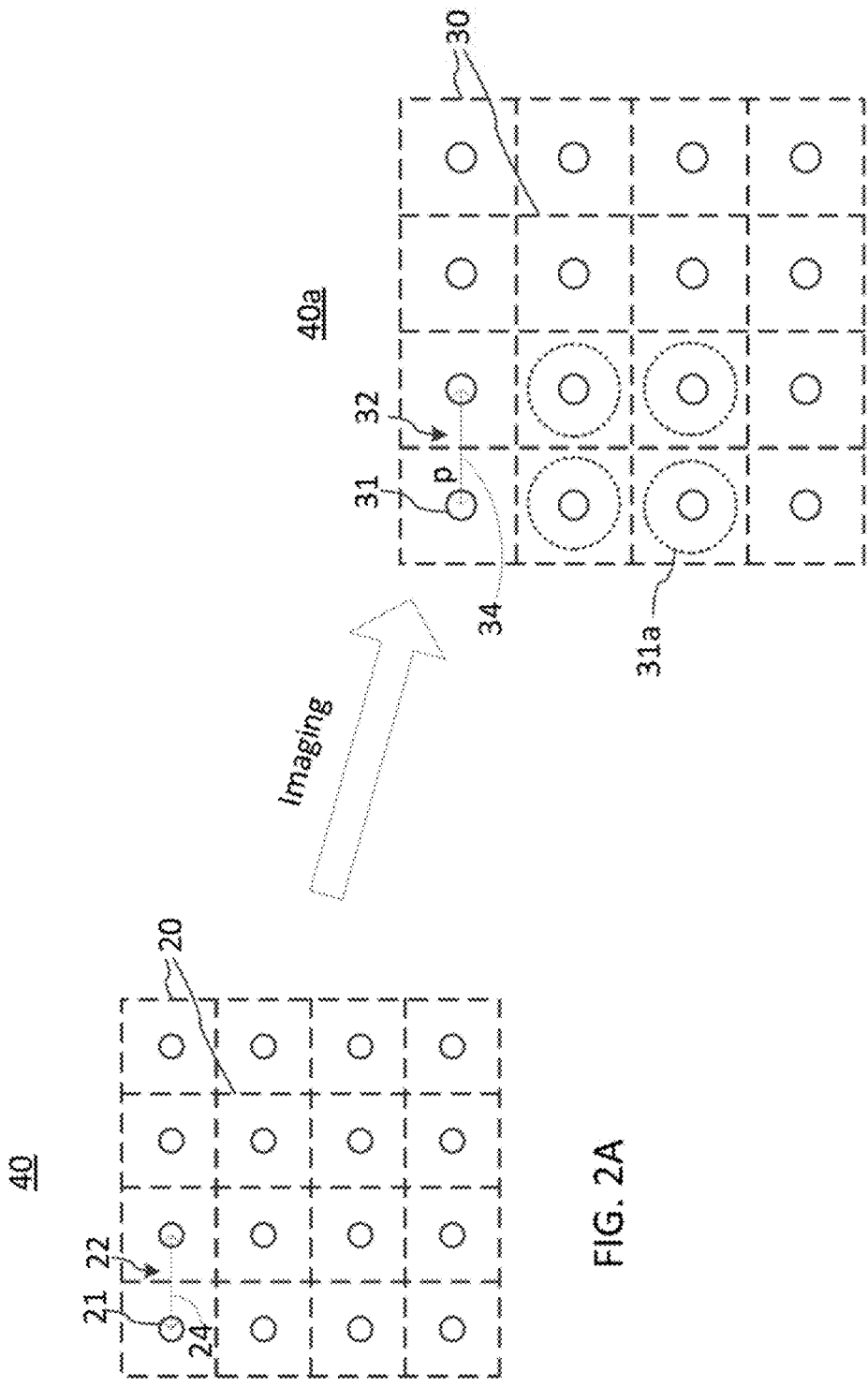

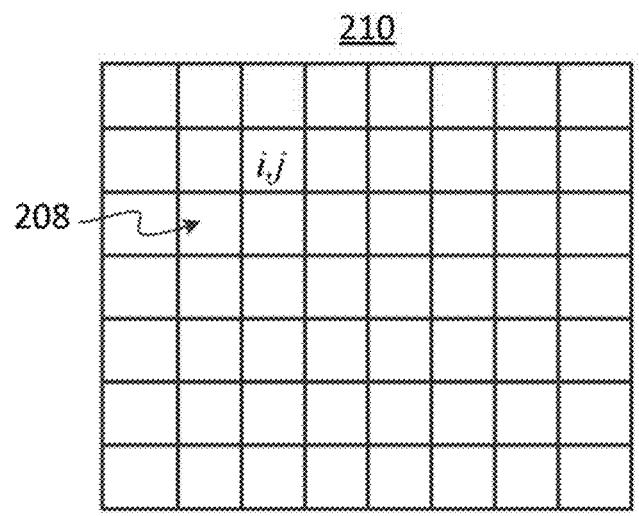
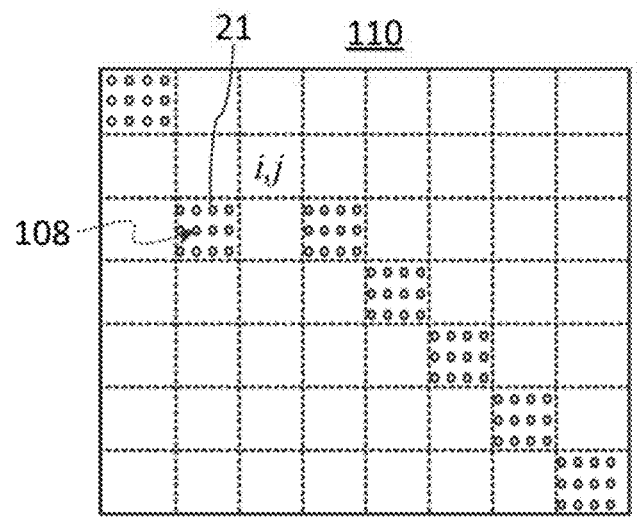
FIG. 7

DISPLAY WITH GAZE-ADAPTIVE RESOLUTION ENHANCEMENT

CROSS REFERENCE TO RELATED APPLICATIONS

The present invention claims priority from U.S. Patent Application No. 62/658,522 filed Apr. 16, 2018, which is incorporated herein by reference.

TECHNICAL FIELD

The present disclosure generally relates to optical display systems and devices, and in particular to head mounted displays (HMDs) and components therefor.

BACKGROUND

HMDs are used to present virtual scenery to a user, or to augment real scenery with virtual information or virtual objects. An HMD typically includes a pixelated electronic display, which displays images by selectively exciting display pixels and/or color sub-pixels to a various degree of luminance. The number of display pixels per unit area, or pixel density, defines a native resolution of the display. Imaging optics may be present that presents the displayed images to the user with magnification, thereby magnifying the display pixels for the user.

Humans with normal visual acuity, typically identified as 20/20 vision, can distinguish two points separated by an angle of one minute of arc (1'), which is the sharpest eyesight observed in the foveola. Within about +/−10° of the foveola, the visual acuity drops to 20/100, which correspond to a resolution angle of 5'. Thus, a typical human eye with the 20/20 sight can resolve two pixels in an image if the light rays they emit enter the eye at an angle to each other as small as 1'. However, the pixel density of an electronic display may be insufficient to directly support the ultimate resolution of a human eye; for example, rays emitted by neighboring pixels of an electronic display used in a typical HDM may enter the eye at an angle greater than 1', and the user perception of the displayed image may suffer because of that. In addition, some displays have relatively small light emitting areas that are surrounded by interstitial areas from which no light emanates. These interstitial areas are typically dark and may lead to a visual artifact known as screen door when the viewer is able to visually resolve the dark and active areas of the pixels.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein:

FIG. 2A is a schematic diagram of a 4×4 pixel area of a pixel array of an electronic display showing interstitial spaces between pixel active areas;

FIG. 2B is a schematic diagram illustrating an image of the 4×4 pixel area of the pixel array of FIG. 2A that may be formed in a display system with magnification and/or active area size correction;

FIG. 7 is a schematic diagram illustrating an example segment array of the SRED of FIG. 6 and corresponding areas of the pixel array of the electronic display;

DETAILED DESCRIPTION

Figure 1A:
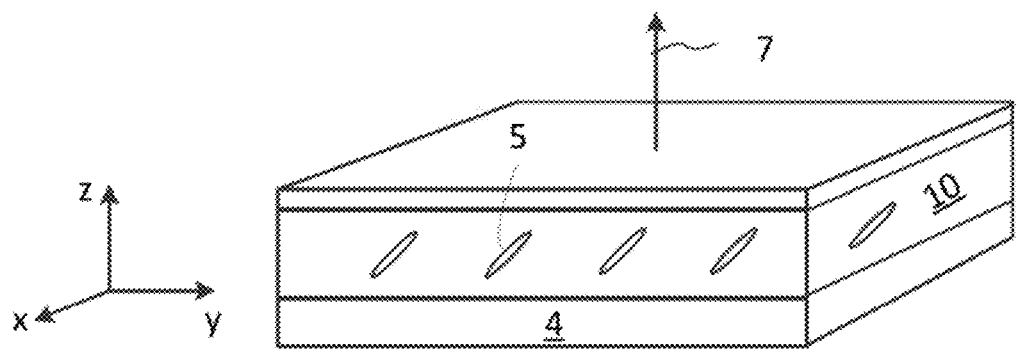
FIG. 1A is a schematic isometric view of a liquid crystal (LC) polarization device.

In the following description, for purposes of explanation and not limitation, specific details are set forth, such as particular optical and electronic circuits, optical and electronic components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second", and so forth are not intended to imply sequential ordering, but rather are intended to distinguish one element from another, unless explicitly stated. Similarly, sequential ordering of method or process steps does not imply a sequential order of their execution, unless explicitly stated. The terms "frame" and "image frame" are used herein interchangeably and encompass frames carrying image data for a still image and video frames carrying image data for a video.

Furthermore, the following abbreviations and acronyms may be used in the present document:
HMD Head Mounted Display
VR Virtual Reality
AR Augmented Reality
MR Mixed Reality
LC Liquid Crystal
LED Light Emitting Diode
CP Circular Polarized
LCP Left-handed Circular Polarized
RCP Right-handed Circular Polarized
HWP Half-Wave Plate, i.e. a waveplate with a modulo $2\pi$ retardance of an odd number of $\pi$ radian or an odd number of half-waves
QWP Quarter-Wave Plate, i.e. a waveplate with a modulo $2\pi$ retardance of $\pi/2$ radian
nWP n-wave Plate, i.e. a waveplate with a retardance of n·λ, or an integer number n=0, 1, 2 ... of operating wavelengths λ

The present disclosure relates to a method and related systems and devices that may correct for at least some pixelation related artifacts in various display systems, including but not limited to display systems for artificial reality applications such as a head mounted display (HMD) and a near-eye display (NED). The term "artificial reality" relates to a presentation of reality that has been adjusted in some manner. It encompasses a virtual reality (VR), an augmented reality (AR), a mixed reality (MR), a hybrid reality, or some combination and/or derivatives thereof. Pixelation relates to visual artifacts that may appear when the pixelated nature of an image presented by an electronic display becomes noticeable to the user. Pixelation artifacts that may be at least partially compensated by using approaches and techniques described herein include pixel-related limitations on image resolution that may be noticeable to a viewer, which may include limitations related to a display pixel density and the appearance of defective pixels in the image. Here, the term 'defective pixel' relates to pixels that lose the ability to emit light, which may be referred to as "dead pixels", and pixels that emit less or more light than prescribed by a data signal applied to the pixel. The terms "shift" and "shifting" may encompass positional and angular shifts and positional and angular shifting, respectively.

An aspect of the present disclosure provides an apparatus comprising: an electronic display comprising a pixel array configured to display a frame, the pixel array comprising a plurality of display pixels; an eye tracking device configured to determine a gaze direction of a user of the electronic display; and, an optical block for forming a frame image from the frame displayed by the electronic display, the optical block comprising a segmented resolution enhancing device (SRED) operatively coupled to the eye tracking device, the frame image comprising an array of image pixels disposed at an image pixel pitch p. The SRED may comprise a plurality of device segments configured to be individually activated in response to a signal from the eye tracking device, each device segment being optically coupled to a different group of display pixels of the pixel array, for selectively enhancing effective resolution for a portion of the frame image in the gaze direction.

The apparatus may further comprise a controller configured to activate a selected device segment in the gaze direction from the array of device segments based on the signal from the eye tracking device.

The apparatus may further comprise a display processor configured to provide pixel data to the electronic display for displaying the frame, identify a selected group of display pixels, from the different groups of display pixels of the electronic display, that is optically coupled to the selected device segment, and perform a selective pixel update of the selected group of pixels with new pixel data at least once while the frame is being displayed by the electronic display.

The apparatus of claim 3 wherein the selective pixel update is performed without updating a peripheral group of display pixels located outside of the selected group of display pixels with new pixel data while the frame is being displayed.

In some implementations each device segment may comprise a light steering switch (LSS) configured to switch, upon activation by the controller, between two or more light steering states while the frame is being displayed, so as to provide a sequence of offset images for the portion of the frame image in the gaze direction.

In some implementations the selective pixel update may be performed in coordination with switching the LSS of the selected device segment.

In some implementations the LSS may be operable, upon activation by the controller, to provide the sequence of mutually offset images comprising two images having a spatial offset s therebetween equal to a fraction of the image pixel pitch p.

The frame image may comprise interstitial areas between adjacent image pixels that are at least equal to the image pixels in size, and the spatial offset s may be such that at least some of the image pixels of a first of the two mutually offset images are located in the interstitial spaces of the second of the mutually offset images.

In some implementations the display processor may be configured to selectively sub-sample input frame data for the selected group of display pixels at two or more sampling grids with a sampling offset therebetween matching the spatial offset s.

In some implementations the SRED may comprise a first polarization grating and a first polarization switch disposed in sequence with the first polarization grating, wherein at least one of the first polarization grating or the first polarization switch is segmented to define the plurality of device segments. At least one of the electronic display or the optics block may comprise a polarization element configured to provide polarized pixel light from the electronic display to the SRED.

In some implementations the electronic display may be configured to transmit polarized light.

In some implementations the apparatus may comprise polarization device disposed optically between the electronic display and the SRED and configured to provide light from the electronic display to the SRED in a circular polarization state.

In some implementations at least one of the first polarization switch or the first polarization grating may comprise an active LC device comprising an LC layer disposed between two electrodes, at least one of which is transparent, and wherein at least one of the two electrodes comprises a plurality of electrically separate electrode segments.

In some implementations the SRED may further comprise a second polarization grating disposed in sequence with a second polarization switch, at least one of which is segmented to match segments of the at least one of the first polarization grating or the first polarization switch. In some implementations the second polarization grating may be disposed with a rotational offset relative to the first polarization grating. In some implementations the rotational offset is substantially 90°. In some implementations at least one of the first polarization grating or the second polarization grating comprises at least one of: a liquid crystal (LC) Pancharatnam Berry Phase (PBP) grating or an LC volume holographic grating. In some implementations at least one of the first polarization switch or the second polarization switch may comprise an active LC HWP.

An aspect of the present disclosure provides a method for operating a display apparatus, the method comprising: displaying a frame with an electronic display comprising an array of display pixels; forming an image of the displayed frame to obtain an image frame comprising an array of image pixels, the array of image pixels comprising image pixels disposed at an image pixel pitch p; determining, with an eye tracking device, a gaze direction of a user of the electronic display; and, selectively shifting a portion of the frame image located in the gaze direction, at least once while displaying the frame, by at least a fraction of the image pixel pitch.

Figure 1B:
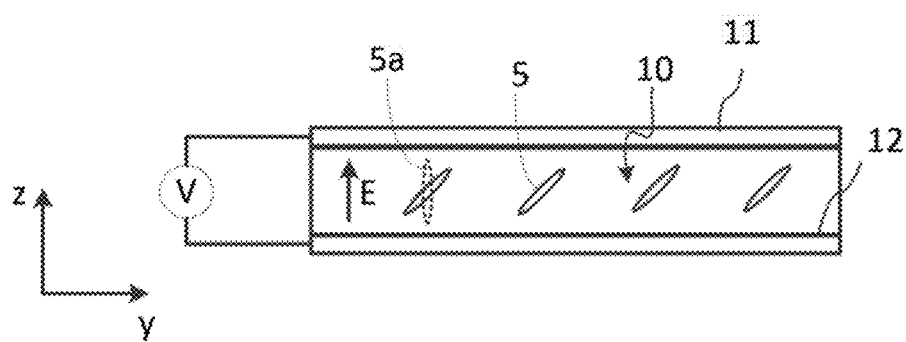
FIG. 1B is a schematic side view of an electrically controlled active LC device.
Figure 1C:
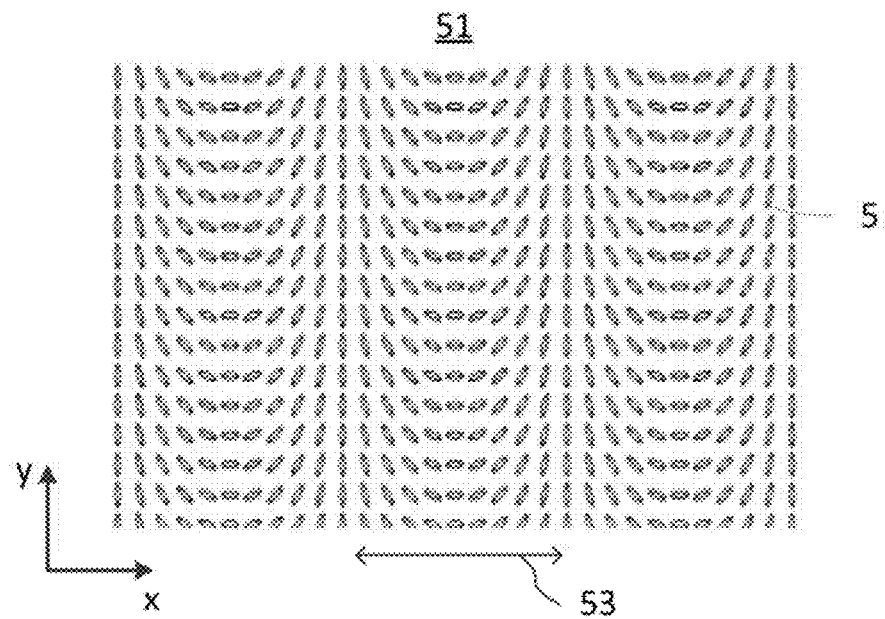
FIG. 1C is a schematic plan view of an LC Pancharatnam Berry Phase (PBP) grating.

With reference to FIGS. 1A-1C, some of the embodiments described herein may utilize liquid crystal (LC) based devices that operate in a polarization-sensitive manner. Such devices include, but are not limited to, LC polarization gratings and LC polarization switches. Referring first to FIG. 1A, LC devices described herein may be in the form of, or include, an LC layer 10 supported by a transparent or reflective substrate 4. The polarization properties of these devices may depend on the material properties of the LC layer, orientation of LC molecules 5 within the layer, the thickness of the LC layer, and the wavelength of incident light. The orientation of LC molecules 5 within the LC layer may be defined in part by an alignment layer or layers (not shown) that may be disposed immediately adjacent to the LC layer 10. An LC device in which the orientation of LC molecules is generally uniform across the LC layer may operate as a waveplate retarder. For incident light of a specific polarization, an LC device in which the orientation of LC molecules varies in the plane of the layer, denoted as the (x,y) plane in FIG. 1A, may function as a lens or as a grating, depending on the LC orientation pattern. Volume holographic gratings with desired polarization processing properties may be fabricated with the LC molecule orientation varying both in plane of the LC layer and in the direction normal thereto (z-axis in FIGS. 1A, 1B), i.e. along an optical axis 7 of the LC device. An LC device may be active, where the LC material orientation is electrically controlled, or passive, where the LC material orientation is fixed in place via material properties, for example by the alignment layers and/or by a polymer mixed into the LC fluid and cured at a particular orientation within the LC layer.

Referring to FIG. 1B, an active LC device may be constructed with the LC layer 10 sandwiched between two electrodes 11, 12 that are transparent in the wavelength range of intended operation, for example two ITO (indium tin oxide) layers. In the absence of voltage between the electrodes 11,12, the LC molecules 5 may be oriented in a default pattern that imposes desired birefringence properties on the device, for example a desired uniform or non-uniform retardance. Applying a sufficient voltage V between the electrodes 11 and 12 may reversibly re-align LC molecules 5 in a way that causes the LC layer 10 to transmit normally incident light without substantially changing the light's polarization or propagation direction. For example, in some LC materials applying a sufficient voltage V between the electrodes 11 and 12 may align the LC molecules 5 along the electric field, as indicated at 5a in the figure, so that the LC layer 310 will lose its birefringence for light at normal or close to normal incidence. An example of an active LC device is an active waveplate, also referred to herein as an active retarder, which retardance may be switched off and back on by applying a voltage V and by turning the voltage off, respectively. For example, an active LC device may be constructed to provide a HWP retardance in the absence of applied voltage, and substantially zero retardance when a sufficient voltage V is applied. One or more embodiments described herein may utilize such an active LC HWP as a polarization switch for polarized light. For example such polarization switch may reverse the chirality of circular polarized (CP) light incident thereon in the absence of voltage (OFF state), and may leave the incident polarization state unchanged in the presence of voltage (ON state). The relationship between the applied voltage and the polarization action of an LC waveplate may be reversed in embodiments using different LC materials.

Figure 1D:
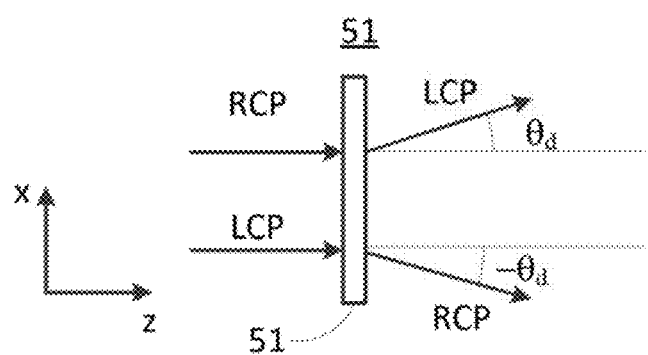
FIG. 1D is a schematic diagram illustrating the operation of an LC PBP grating.

Referring to FIGS. 1C and 1D, an LC device 51 in which the orientation of the LC material varies periodically or nearly periodically along a direction in the plane of the LC layer may function as a polarization grating. Such a grating may direct incident light at an angle that depends on the polarization state of the incident light. LC polarization gratings can be made, for example, by a photoalignment method with liquid crystal polymers and a polarization holography setup. One example of an LC polarization grating is a Pancharatnam Berry Phase (PBP) grating, in which grating 'groves' are formed by spatially varying birefringence in the plane of the grating. Such gratings may also be referred to as geometric phase gratings. The LC molecules 5 in such grating have varying orientations in the plane of the LC layer, indicated in the figure as an (x,y) plane, defining a device birefringence profile in the plane of the LC layer. The azimuth angle of the LC molecules 5, which defines their orientation in the plane of the grating, continuously changes from center to the edge, typically with a fixed pitch 53. The LC layer in a PBP grating may be configured to deflect a right-circular polarized (RCP) light by a diffraction angle $\theta_d$ in one direction, and to deflect a left-circular polarized (LCP) light in an opposite direction, generally by the same diffraction angle $\theta_d$ and in a same plane, as illustrated in FIG. 1D. An LC PBP grating may be configured to provide a desired magnitude of the diffraction angle $\theta_d$. Such a grating may be either active, where the LC material orientation is electrically controlled, or passive, where the LC material orientation is fixed in place via material properties and/or alignment layers. An active LC PBP grating may be constructed as described hereinabove with reference to FIG. 1B. For example, an active LC PBP grating may deflect incident CP light by the diffraction angle $+\backslash -\theta_d$ depending on the chirality of incident light while simultaneously reversing its chirality in the absence of voltage (OFF state), and may leave both the direction of propagation and the polarization state of incident light unchanged in the presence of voltage (ON state). Another example of an LC polarization grating is a volume holographic LC grating, in which the orientation of the LC layer material may vary both in the plane of the LC layer and in the direction normal to the LC layer, i.e. in both the azimuth angle and the tilt angle that defines its orientation relative to the direction normal to the plane of the grating. Such gratings may be constructed for example to selectively deflect only one of two orthogonal linear polarizations, without substantially changing the propagation direction of the other of the two orthogonal polarizations. A volume holographic LC grating may operate, for example, as an active element where the LC material is electrically controlled, and/or as a passive element, together with a linear polarizer and an active polarization rotator operable to switch the polarization status of the incident light. Embodiments described below with reference to LC PBP gratings may be modified to use such volume holographic LC gratings instead.

Embodiments of the present disclosure may relate to pixelated electronic displays that include a plurality of pixels, typically but not necessarily disposed on a rectangular grid, which can be selectively excited by pixel data signals to display images. The terms "electronic display" and "pixelated display" may be used herein interchangeably and encompass arrayed light sources with multiple individual emitters, which may be disposed in a two-dimensional (2D) array or in a one-dimensional (1D) array. Pixel data corresponding to a same visual pattern to be viewed as a single image may be provided to the electronic display, or a processor thereof, in the form of an image frame. The visual pattern to be displayed for viewing as a single image may represent for example a photographic image, an instantaneous scene of a video, or specific information in a visual form. The terms image data, image signal, and image frame, may be used to encompass both video and still image data, video and still image signals, and video and still image frames, respectively. Generally one image frame, which may also be referred to herein simply as frame, represents a visual pattern sampled at a specified sampling grid, which defines the frame's resolution. Embodiments of the present disclosure may utilize an approach in which a frame is displayed by the electronic display in a sequence of subframes. These subframes may correspond to a sampling grid matching the pixel array of the electronic display, and may differ by one or more sampling offsets between the subframes. Here the term "sampling offset" encompasses an offset in a column or row counter of the display's pixel array, and fractional offsets corresponding to a fraction of a pixel pitch of the display. In some embodiments the sequence of subframes may be obtained by sub-sampling a high-resolution frame. Here, the term sub-sampling, when used in reference to a frame, refers to sampling a visual pattern or image defined by the frame at a sampling grid of a lower resolution than that of the frame, and may include using an interpolation operation.

FIG. 2A schematically illustrates a portion of a pixel array of an electronic display 40 formed of display pixels 20; although only a 4×4 segment of the display pixel array is shown, a typical 2D display may include hundreds or thousands of pixels in at least one dimension. Each display pixel 20 may include one or more active areas 21 which in operation emit or transmit image light, and which may include one or more subpixels. Each display pixel 20 may also include interstitial spaces 22 from which no light can be emitted or transmitted, or from which the illumination does not contribute to the image presented to the viewer. The proportion of the active area 21 to the inactive area 22 is known as the fill factor. The interstitial spaces 22 may also be referred to herein as the dark spaces or dark areas. Each active area 21 may include some combination of two or more subpixels that may be configured to emit or transmit light of different colors, for example a red (R) subpixel, a green (G) subpixel, and a blue (B) subpixel, although other color schemes are also possible. Display 40 may be for example an LC display, in which case the active areas in each pixel may be in the form, or include, LC apertures with controllable transmission of backlit light, or an LED display, in which case each active area may be in the form, or include, an exit aperture of a light emitting diode (LED). As used herein, the term "LED display" encompasses OLED and AMOLED displays. Displays in which individual active areas are formed with light emitters or transmitters of other types, such as for example but not exclusively vertical-cavity lasers (VCSELs), are also within the scope of the present disclosure. The distance 24 between centers of corresponding active areas 21 of adjacent pixels 20 along a specified direction in the plane of the pixel array may be referred to as the display pixel pitch. The presence of the dark spaces 22 may lead to an undesirable visual artifact known as the "screen door" effect (SDE), when the boundaries between individual active areas become visible to a viewer. This effect may be particularly pronounced in display systems with magnification, such as an HMD or a projection display.

FIG. 2B illustrates an image 40a of the 4×4 portion of the display pixel array of FIG. 2A as may be presented to the user in a display system, with images 31 of pixel active areas 21 disposed in a corresponding array with an image pixel pitch p 34. Images 31 of pixel active areas may be referred to herein as image pixels. In some embodiments image 40a may be a magnified image of the pixel array of the electronic display 40 obtained in a display system including magnification optics. The dark interstitial spaces 22 of display 40 may give rise to dark spaces 32 separating adjacent image pixels 31 in the image 40a. These dark spaces may be visible if the viewing angle subtended by the dark space 31 in the image exceeds the eye resolution, e.g. 1' for the 20/20 sight, resulting in the SDE. The SDE may be reduced or eliminated by using image pixel light expanders, such as a microlens array, or by using de-focusing and/or blurring components or techniques, which effectively expand pixel images 31 into the interstitial spaces 32, as schematically illustrated at 31a. Neither of these approaches would however improve the resolution of the display for the viewer. Embodiments described hereinbelow may replace, or in some instances supplement, the use of such image pixel expanding or blurring techniques with a dynamic approach to image enhancement allowing to increase an effective resolution of an image produced with the display in the gaze direction of the viewer.

Embodiments described hereinbelow utilize a gaze-adaptive technique to correct for at least some image imperfections that may occur in display systems with pixelated displays, and to enhance image quality as perceived by the viewer in a manner that adapts to spatial acuity characteristics of human vision. In at least some embodiments the technique relies in part on a finite response time of a human visual system to fast changing images, which causes several images appearing one after another within the visual response time to be perceived by the viewer as a single image. In at least some embodiments the technique utilizes the differences in the vision acuity between human vision in the gaze direction relative to the peripheral vision. Gaze-adaptive techniques described herein may be utilized in display systems with eye tracking, such as for example an HMD or a NED.

Some embodiments described herein implement a gaze-adaptive resolution enhancement (GARE) techniques for enhancing an effective resolution of a displayed image. A GARE technique (GARET) may include a) displaying, with a pixelated electronic display, an image defined by pixel or frame data, b) detecting gaze direction, and c) selectively enhancing effective resolution in a portion of the image in the gaze direction relative to the rest of the display.

Figure 3A:
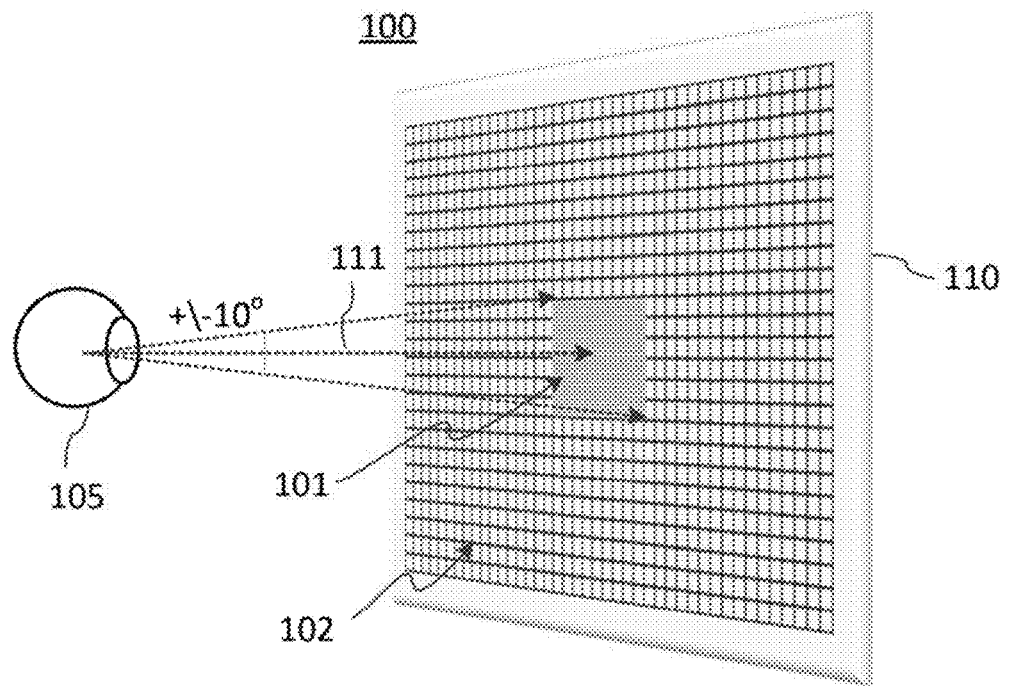
FIG. 3A is a schematic diagram illustrating an eye acuity display system with a gaze-adaptive resolution enhancement for a central gaze direction.
Figure 3B:
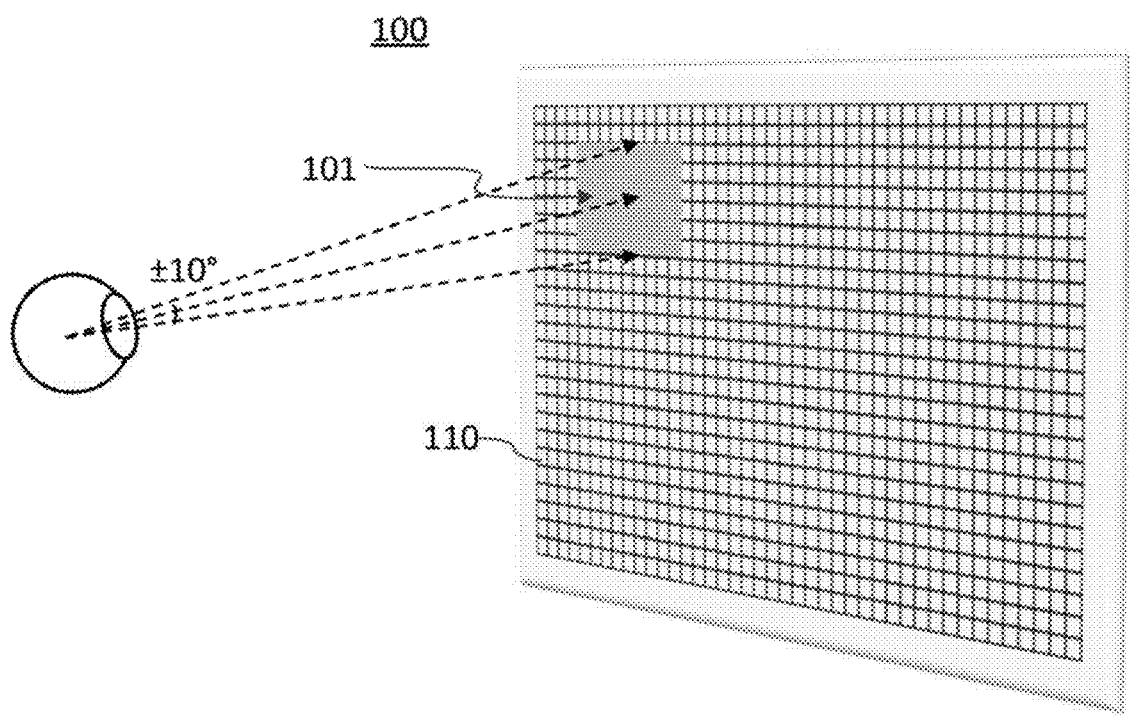
FIG. 3B is a schematic diagram illustrating the eye acuity display system of FIG. 3A with a gaze-adaptive resolution enhancement for a gaze directed to a display periphery.

With reference to FIGS. 3A and 3B, there is shown a simplified display system 100 illustrating general principles of operation of a gaze-adaptive display. System 100 may also be referred to herein as an eye-acuity display 100, as it may be operated to adopt display's resolution to the eye-acuity variations of human vision with respect to peripheral and central vision. System 100 includes an electronic display 110 having an array of pixels. The number of pixels per unit area, i.e. pixel density, defines the display resolution and typically limits an image resolution experienced by users of conventional video systems and conventional HMDs. System 100 includes features that enhance an effective resolution of display 110 as experienced by the viewer, by effectively enhancing the system resolution in a selected display portion of the pixel display in the gaze direction. Referring to FIG. 3A, when the viewer's gaze if directed to a center of display 110, system 100 selectively enhances the effective resolution of display 110 in a display area 101, so that the user perceives it as having a high pixel density, while leaving the rest of the display area 102 in the peripheral vision of the user to be perceived as having a lower resolution, for example as may be defined by the nominal pixel density of display 110. The size of the high-acuity area 101 may correspond to the central vision of a human eye with the highest visual acuity, for example within a solid angle of +\−10° of the gaze direction 111, while the areas 102 of the display perceived with the peripheral vision remain with the lower effective resolution, for example as defined by the nominal pixel density of display 110. Once the gaze direction changes, the position of the high-acuity area 101 on the display changes to follow the gaze direction, as illustrated in FIG. 3B by way of example. In various embodiment the relative size of the high-acuity area 101 may differ, and may for example correspond to a subtended angle of view in the range from +\−5° to +\−30°, however the eye-acuity area 101 of any size that is a fraction of the total light-emitting area of display 110 would be within the scope of the present disclosure.

In at least some embodiments display system 100 may include other elements and devices, such as viewing, imaging and/or light conditioning optics disposed in an optical path between the viewer's eye 105 and display 110. The imaging optics may present to the viewer an image of the pixel array of display 110. In operation, the imaging optics may present to the viewer an image of a frame currently being displayed by the pixel array, as illustrated for example in FIG. 2B, with active areas of each display pixel represented in the image as image pixels 31.

In one or more embodiments the process of selectively enhancing effective image resolution in a selected portion of the image may include dynamically shifting the selected image portion in the gaze direction by a fraction of the image pixel pitch at least once while displaying a frame, and selectively refreshing the pixel data for the selected image portion being shifted in coordination with the shifting. This forms a time sequence of mutually offset images for the selected portion of the frame image. These mutually offset images may be presented to the viewer's eye sequentially while the current frame is being displayed. A superposition of mutually offset images of the selected portion of the displayed frame before and after the local image shift forms a compound image which may have a higher image pixel density than each of the of the mutually offset images, and/or have image pixels from different offset images overlap to provide pixel redundancy.

Figure 4A:
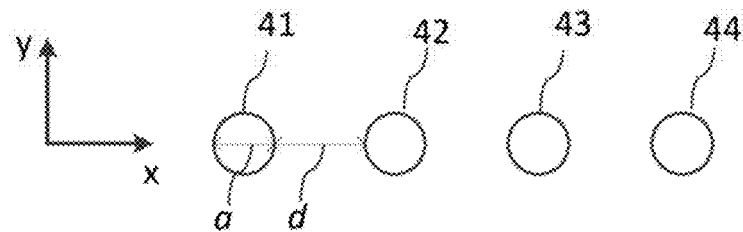
FIG. 4A is a schematic diagram illustrating a linear array of four adjacent pixels of an electronic display in one pixel row or column.
Figure 4B:
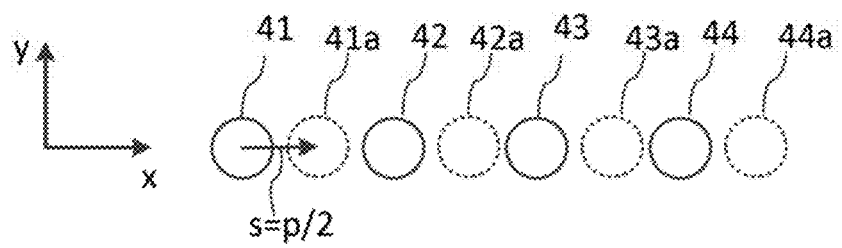
FIG. 4B is a schematic diagram illustrating increasing effective image pixel density by dynamic image displacement for the linear array of pixels of FIG. 4A.
Figure 4C:
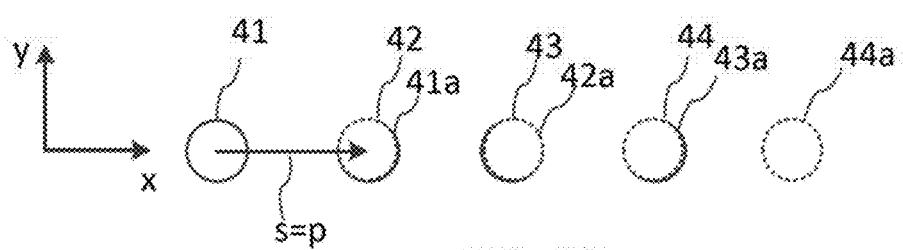
FIG. 4C is a schematic diagram illustrating the dynamic image displacement of the linear array of pixels of FIG. 4A for defective pixel correction.

FIGS. 4A-4C schematically illustrate a dynamic image shifting by way of example with reference to a linear sequence of four image pixels 41-44 disposed along an x-axis, which may correspond to four consecutive pixels in a row or a column of display pixels of an electronic display. In the illustrated example the size a of image pixels 41-44 does not exceed the size d of the dark spaces between them, as indicated in FIG. 4A. In other embodiments the image pixels may be greater in size than the dark spaces between them. FIG. 4B illustrates the shifting of the image pixels 41-44 by a distance s corresponding to a fraction of the image pixel pitch p in the image space, p=(a+d), in the illustrated example by s=p/2. This shift produces a new set of image pixels 41a-44a that may be located at least partially in the dark spaces of the image prior to the shift. Image pixels 41-44 prior to the shift may be said to belong to a first subframe image, and image pixels 41a-44a after the shift may be said to belong to second subframe image that is spatially offset from the first subframe image by the image offset or shift s. Consecutive subframes may be displayed by the electronic display at a display frame rate R. If the frame rate R is high enough, the viewer perceives an image formed by the two subframe images as a single compound image having twice the pixel density in the direction of the shift, i.e. along the x-axis in the illustrated example. This technique effectively multiples the number of display pixels per unit area perceived by the viewer, with a maximum pixel multiplication factor determined by the number n of image shifts that may be performed while displaying a frame, and the display fill factor. Hereinbelow example embodiments with n in the range from 2 to 9 are described. Input image frames may thereby be displayed in such embodiments with a lower effective rate R/n over a sequence of n subframes.

FIG. 4C illustrates a mode of operation in which the image pixels 41-44 are shifted by a distance equal to the image pixel pitch p, so that image pixels of two consecutive subframes overlap. This mode of operation provides pixel redundancy and allows one to correct for pixel defects of the display, by placing images of a normally functioning pixel, termed "working pixel", into the image positions of a defective pixel or pixels in a preceding frame or subframe. As the likelihood of having defective pixel increases with the size of the pixel array, yield of usable electronic displays may be improved by configuring the display system to use normally functioning pixels to compensate for their defective neighbors. A defective pixel that either no longer operates or operates at a lower light level than desired can be compensated by temporally overlapping either a single neighbor or multiple neighbors to temporally fill in the missing light from the dead or defective pixel.

Figure 4D:
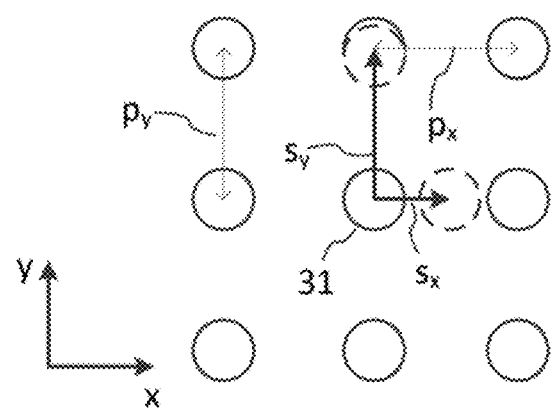
FIG. 4D is a schematic diagram illustrating combined resolution enhancement and pixel correction by dynamic image displacement in a 3×3 pixel array.

With reference to FIG. 4D, in some embodiments combining resolution enhancement with pixel correction may include shifting the image pixels in a first direction by a fraction of the image pixel pitch in the first direction, and/or shifting the image pixels in a second direction by an image pixel pitch in the second direction. For example, a display system or module with GARE, while displaying a frame, may first shift a selected portion of the frame image located at the gaze direction in the direction of image pixel rows by a fraction of the row pixel pitch $p_x$ to double the effective image pixel density, and then to shift the selected portion of the image in a pixel column direction by one column pixel pitch $p_y$ to correct for a defective pixel. In another embodiment the selected portion of the frame image may be first shifted in the pixel column direction by a fraction of the column pixel pitch for enhancing the image resolution, and then shifted in the pixel row direction by one row pixel pitch, thereby enabling the compensation of defective pixels.

Figure 5:
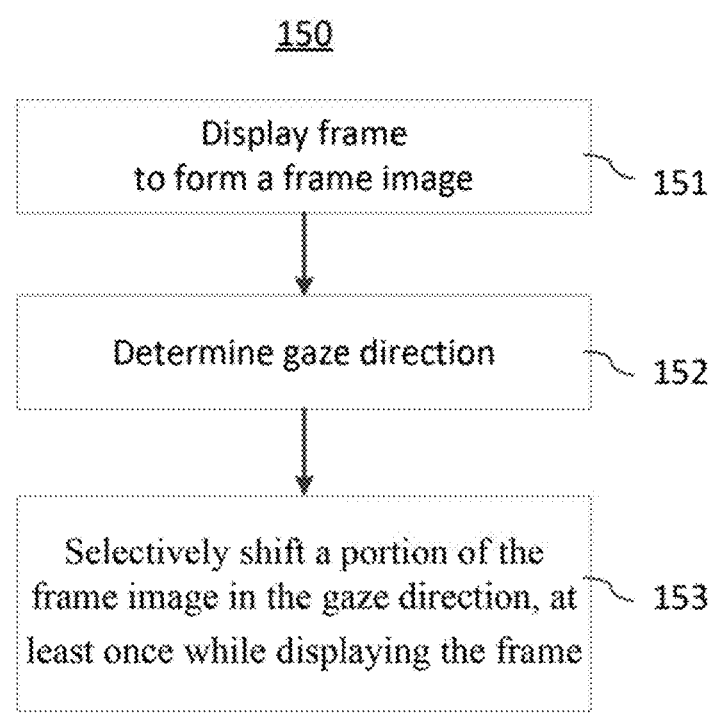
FIG. 5 is a flowchart of a method for gaze-adaptive operation of an electronic display to provide an effective image resolution enhancement for the viewer.

Referring to FIG. 5, a GARE method 150 to enhance effective image resolution for a viewer may include a step or process 151 wherein an input frame is displayed with an electronic display to form a frame image, a step or process 152 to determine the gaze direction of the viewer, and a step or process 153 to selectively shift a portion of the frame image in the gaze direction at least once while the frame is being displayed.

Figure 6:
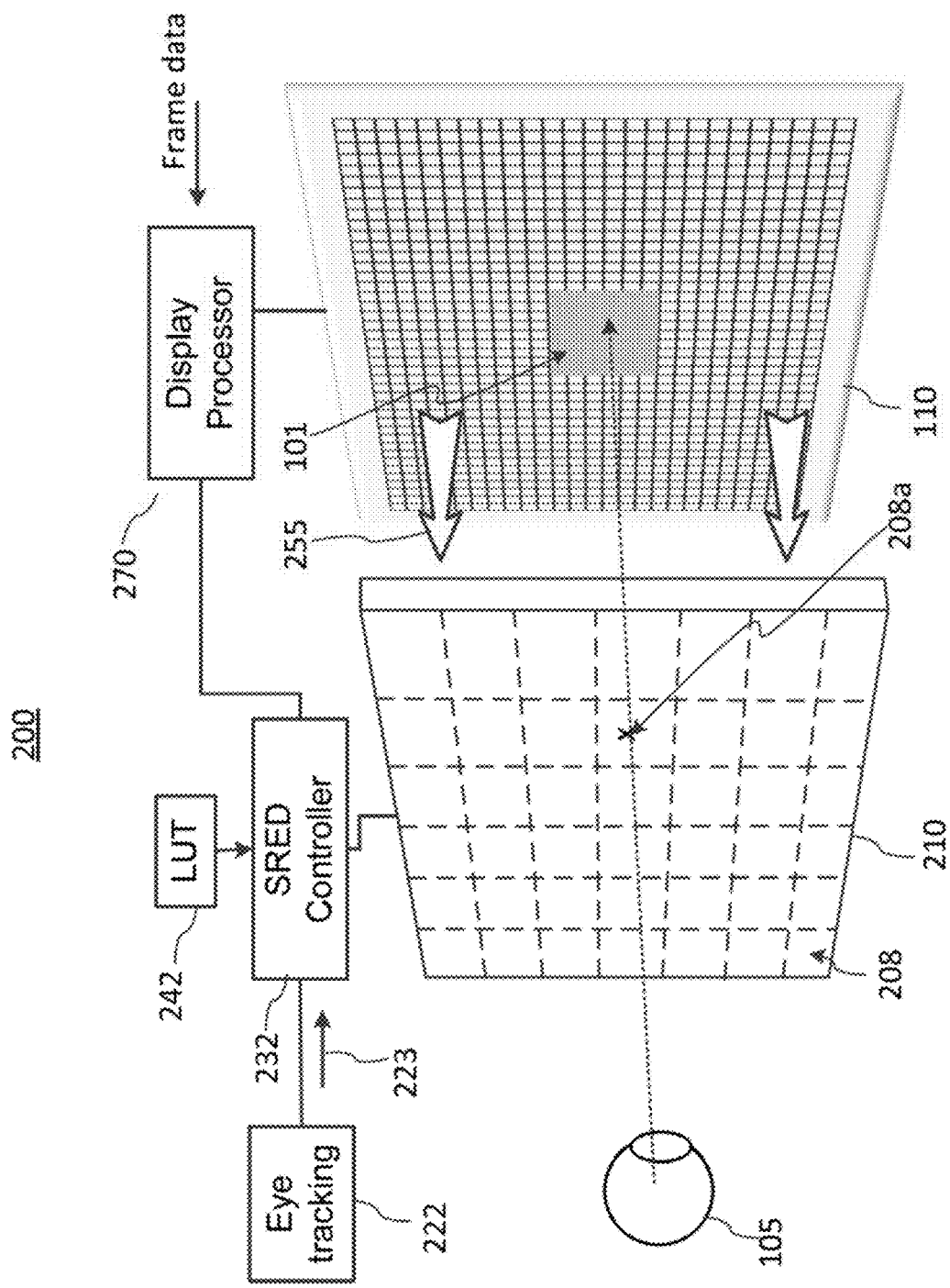
FIG. 6 is a schematic diagram illustrating an embodiment of the eye acuity display system of FIG. 3A with a segmented resolution enhancement device (SRED) for a gaze-adaptive resolution enhancement.

Referring to FIG. 6, an embodiment 200 of the display system 100, also referred to herein as system 200, implements GARE using gaze-adaptive dynamic image shifting. System 200 may include a segmented resolution enhancement device (SRED) 210 disposed in the optical path of image light of display 110, a SRED controller 232 operatively coupled to SRED 210 to control its operation, a display processor 270 operatively coupled to display 110 to provide frame data thereto for displaying a frame, and an eye tracking device or system 222 operatively coupled to controller 232. Display 110 may be, for example, a micro display configured for use in an HMD, and may be for example an LCD, OLED, LED, or u-LED display, or generally any pixelated display suitable for a particular application. The eye tracking device 222 may be for example in the form of any suitable eye tracking device such as those described in relation to HMDs for artificial reality applications. System 200 may also include other elements and devices, such as viewing, imaging and/or light conditioning optics. In operation such optics may present to the viewer an image of a frame being displayed by the pixel array of display 110, which is referred to herein as a frame image.

SRED 210 may be a sectionalized or segmented device comprised of an array of device segments 208, which may also be referred as zones. The device segments or zones 208 are independently addressable by controller 232, and may be separately activated by controller 232. In operation the eye tracking device or system 222 determines a current gaze direction of the user, and transmits information indicative thereof to controller 232, for example by generating a gaze direction signal 223 that may be read by controller 232. In response controller 232 may activate a corresponding selected device segment 208a located in the gaze direction. Other device segments 208 in the peripheral vision of the user may remain inactive, transmitting image light without resolution enhancement or with a smaller resolution enhancement. In some embodiments a group of device segments 208 located at and close to the gaze direction may be activated, with the rest remaining inactive. Information relating each particular device segment 208 of SRED 210 to a distinct range of gaze directions, or a distinct range of the gaze direction signal 232, may be saved in a memory 242, for example as a look-up table (LUT), or in any other suitable form.

Referring to FIG. 6 and FIG. 7, SRED 210 may be disposed in the display system 100 so that different device segments 208 are optically coupled to different areas 108 of the pixel array of display 110, whereby portions of image light 255 that pass through different device segments 208 generally originate from different areas 108 of the display 110, and therefore from different, mostly non-overlapping, distinct groups of display pixels 31. Display areas 108 corresponding to device segments 208 are outlined in FIG. 7 with dotted lines, to indicate a logical rather than physical division. Information relating each device segment 208 to a corresponding area 108 of the pixel array of display 110 may be stored in the memory 242 or a different memory device. This information defines which group of display pixels 31 contribute to image light 255 passing through the selected device segment 208, for example the device segment 208a indicted in FIG. 6. A one-to-one assignment of each device segment 208 to a distinct group of display pixels 21 in a corresponding section 108 of the display 110, may be saved, for example, in the form of a second LUT, or may be contained in the same LUT that assigns device segments in dependence upon the gaze direction. This information may be used by the display processor 270 to identify the group of display pixels 21 that contribute image light to a portion of the frame image in the gaze direction via the selected device segment 208a. The display processor 270 may be configured to process frame data for each frame so as to provide pixel data for the identified group of display pixels with a greater effective pixel density than for the rest of the display. The greater effective pixel density may be effected in a time-sequential manner, for example in a sequence of offset subframes or partially offset subframes. This may include the display processor 270 performing a selective pixel update of the identified group of pixels 21 with new pixel data at least once while a frame is being displayed by the electronic display 110.

In some embodiments SRED 210 may be in the form of, or include a segmented or pixelated light steering device, with each device segment 208 configured, upon activation by the SRED controller 232, to switch between two or more light steering states while a frame is being displayed by display 110. Each switching shifts a corresponding portion of a frame image provided to the user by some image shift s, forming a sequence of mutually offset images for the portion of the frame image.

Figure 8:
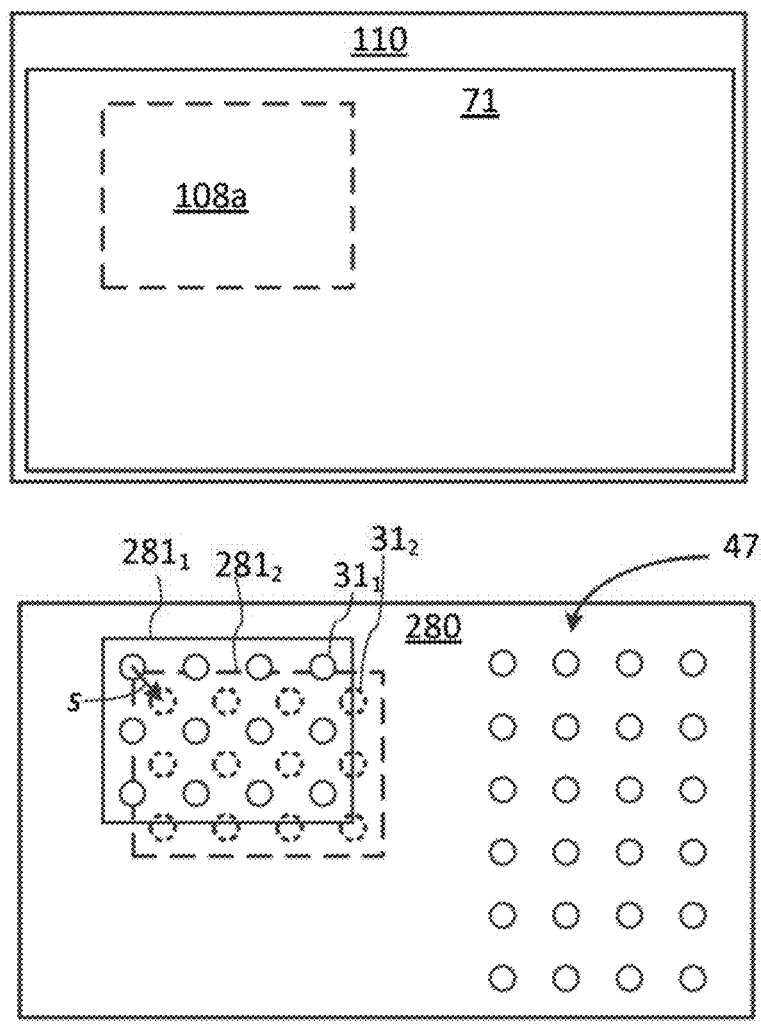
FIG. 8 is a schematic diagram illustrating local image resolution enhancement in the gaze direction by overlaying two mutually offset images of a portion of the displayed frame.
Figure 9:
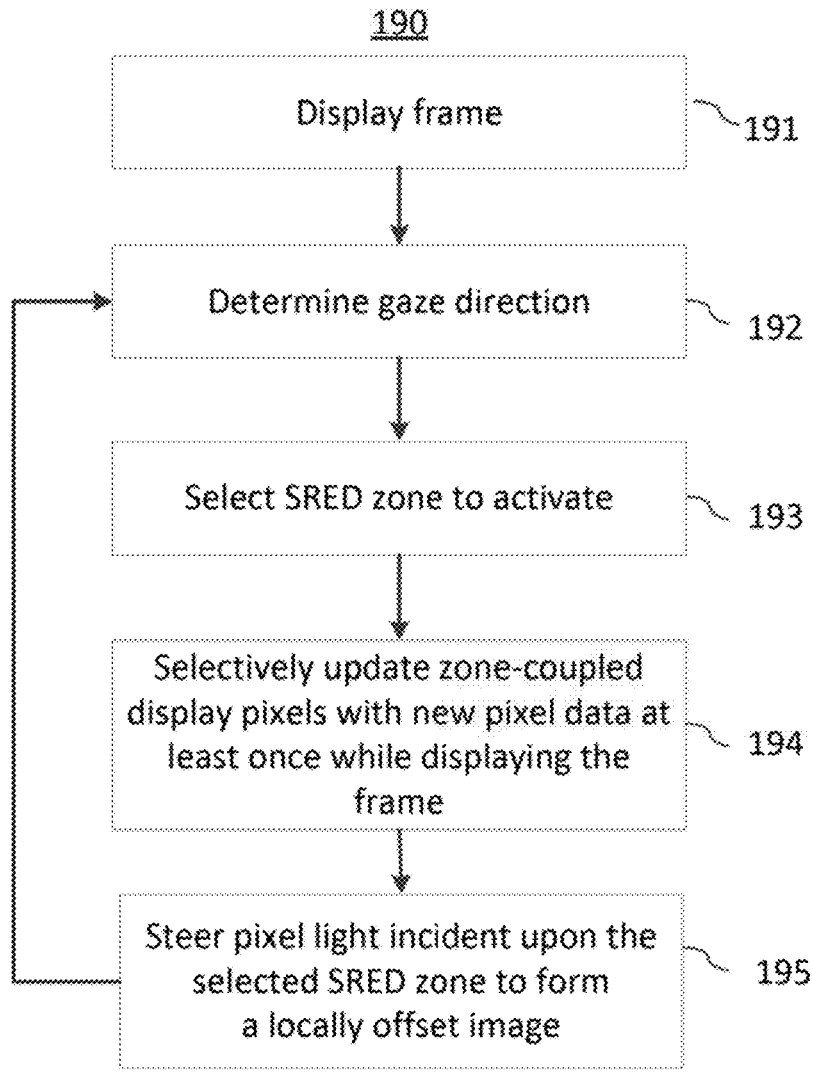
FIG. 9 is a flowchart of a method for gaze-adaptive operation of an electronic display using a light steering SRED.

FIG. 8 schematically illustrates, by way of example, display 110 displaying a frame 71, and a corresponding frame image 280 that is provided to the viewer. Frame 71 may be displayed over some time interval. For example, each frame 71 that the display processor 270 receives may be displayed over a time interval $T_n = nT$, wherein $T=1/R$ is a display frame interval, R is the native frame rate of the display, and $(n-1)$ is the number of image shifts per display frame interval T, $n = 2, 3, \ldots$. A first image portion $281_1$ represents an image of an area 108a of the pixel array of display 110 corresponding to an activated device segment 208a, with the activated device segment 208a in a first light steering state. A second image portion $281_2$ represents an image of the same display area 108a, with the activated device segment 208a in a second light steering state. Switching the activated device segment 208a from the first light steering state to the second light steering state selectively shifts the corresponding portion of the frame image, and each image pixel 31 therein, by the image shift s. In FIG. 9 an image of a same display pixel, or the active area thereof, is indicated as $31_1$ prior to the shift, i.e. in the first image portion $281_1$, and as $31_2$ after the shift, i.e. in the second image portion $281_2$. Image portions $281_1$ and $281_2$ are presented to the viewer in sequence while frame 71 is being displayed, so that the viewer perceives a compound image formed with both the first and second image portions $281_1$ and $281_2$ superimposed. In at least some embodiment SRED 210 is configured so that the image shift s is a fraction of the image pixel pitch p, so as to place each, or at least some, images pixels 31 between adjacent image pixels prior to the shift, for example as illustrated in FIG. 8, thereby effectively doubling image pixel density for the viewer. In other embodiments, or for other image pixels for displays with non-even pixel layouts, the shift may move at least some of the pixels into locations of adjacent pixels prior to the move, thereby enabling defective pixel compensation.

The display processor 270 may be configured to perform a pixel update of a selected group of display pixels, i.e. the display pixels which light is being steered by the activated device segment 208a, with new pixel data in coordination with switching the activated device segment 208a between two light steering states to effect the image shift s. In some embodiments the pixel update is selective and exclusive of a group or groups of display pixels 47 currently located in the peripheral vision of the viewer, for which pixel data is not updated with new and different pixel data during the selective update.

Advantageously, limiting the pixel update to a selected group of display pixels that contribute to the frame image in the gaze direction enables to save computing resources of the display processor 270.

Referring to FIG. 9, a method 190 for operating a display system with a SRED to enhance effective image resolution for a viewer may include a step or process 191 wherein an input frame is displayed by an electronic display 110, a step or process 192 to determine the gaze direction of the viewer, a step or process 193 to activate a SRED segment or zone that is currently in the gaze direction, a step of process 194 to selectively display pixels that are optically coupled to the activated SRED segment or zone with new pixel data at least once while displaying the frame, and a step or process 195 to steer pixel light incident upon the selected SRED zone to form a locally offset image. Method 190 may be an embodiment of method 150 of FIG. 5.

Figure 10:
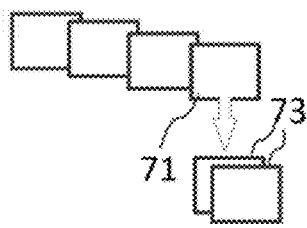
FIG. 10 is a schematic diagram illustrating the process of forming subframe images from input image frames in the display system of FIG. 6 according to an embodiment.

Referring now to FIG. 10 in conjunction with FIGS. 6-9, in some embodiments the display processor 270 may be configured to receive a sequence of input frames 71, and to render each input frame 71 so as to convert it to a sequence of two or more subframes 73 with a sampling offset between the subframes matching the image shift s, and to feed the sequence of subframes 73 to display 110 for displaying at the display frame rate R in coordination with switching the activated device segment 208a. The term "subframe", as used herein, relates to frames defined at the pixel resolution of display 110. All subframes 73 associated with one input frame 71 may share the same pixel data for all or most display pixels outside the selected group of pixels, but have different pixel data for the selected group of pixels.

In embodiments wherein the device segments of SRED 210 are configured to shift respective image portions by a fraction η<1 of the image pixel pitch, the display processor 270 may be configured to receive the input frames 71 that are defined at a higher pixel resolution than that of the display 110, and render each input frame into two or more subframes 73 of a lower resolution. This process may include sub-sampling the input frame 71 to match the pixel resolution of display 110 to form a first subframe 73. The display processor may further selectively sub-sample a portion of the higher-resolution input frame 71 for the selected group of display pixels with a sampling offset corresponding to the image shift s effected by the activated device segment 208a to form a second subframe 73. In embodiments wherein the SRED device segments 208 are configured to switch between n≥3 different light steering states effecting (n−1) image shifts $s_i$, i=1, ..., (n−1), the local sub-sampling of the input frame may be repeated to obtain subsequent subframes 73 with sampling offsets for the selected portion of the input frame matching corresponding image shifts. In the context of this specification, the term sub-sampling, when used in reference to a frame, refers to sampling of a visual pattern defined by the frame at a sampling grid of a lower resolution than that of the frame, and may include using an interpolation operation. Thus the sequence of subframes 73 may present the input frame 71 with a higher sampling density in a portion thereof corresponding to the gaze direction. Localizing the repeated sub-sampling to only a selected portion of the input frame that is currently in the gaze direction saves on computing resourced of the display processor.

By way of example, display 110 may have native resolution of N×M, where N and M are the numbers of pixel columns and rows of the display, respectively; in operation the display processor 270 may receive a sequence of input frames 71 at a resolution of K×L, where K and L are the numbers of columns and rows in the sampling grid used to generate frame 71. In some embodiments the size of the K×L array may exceed the size of the N×M array in at least one of the row and column dimensions, in which case the input frame 71 may be referred to as a high-resolution frame. In some embodiments the size of these arrays may be the same, i.e. K=N and M=L. In some embodiments the display processor 70 may be configured to generate each subframe 73 by interpolating an image defined by a high-resolution input image frame 71 to a N×M sampling grid defined by a pixel layout of display 110, with a sampling offset corresponding to an image shift imparted by the activated device section of SRED 210.

The SRED controller 232 is operable to activate the device section 208a in the gaze direction responsive to a gaze direction signal 223, and to switch the device section 208a between different light-steering states to effect the image shifts, synchronously with the display 110 displaying the subframes 73 with sampling offsets in a portion of the frame matching the image shifts.

Figure 11:
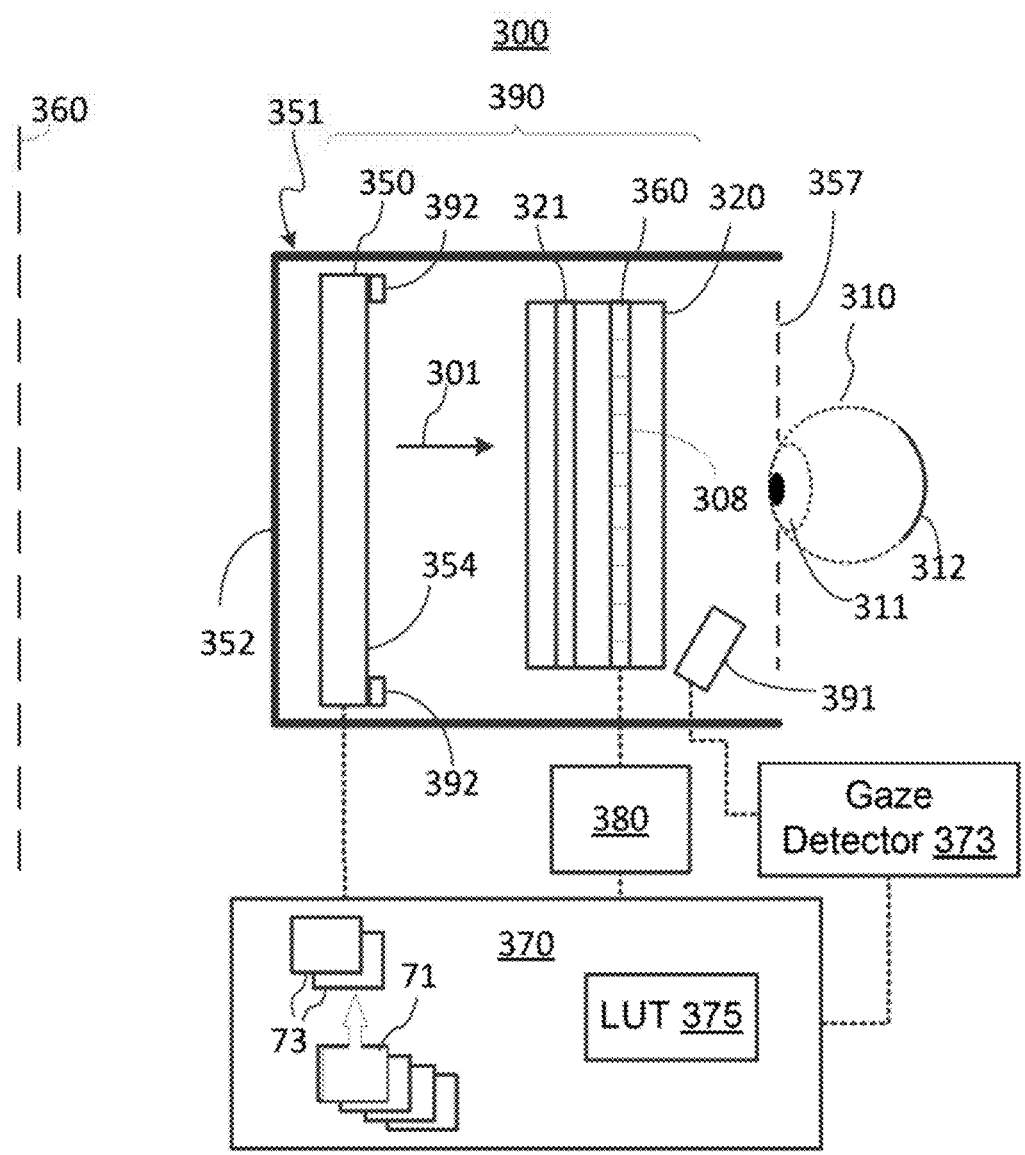
FIG. 11 is a schematic diagram of an example HMD, shown in a cross-sectional view, implementing a gaze-adaptive eye-acuity display system.

Turning now to FIG. 11, there is schematically illustrated a partial cross-sectional view of an example HMD 300 in which the gaze-adaptive resolution enhancement or defective pixel correction may be implemented. HMD 300 may be an embodiment of the display system 100 of FIG. 6. HMD 300 includes an eye-acuity display module 390, which in turn includes an electronic display 350 and an optics block 320 comprising a SRED 360. The electronic display 350 is disposed at a frontal side 352 of a rigid body 351, facing an eye box 357. The optics block 320, which is disposed in the optical path between the display 350 and the eye box 357, transmits image light 301 from the display 350 to the eye box 357. The eye box 357 defines the position of an eye 310 of the user when the user wears HMD 300. The optics block 320 may form a magnified virtual image of the front light-emitting face 354 of the display 350, and thereby an image of a currently displayed frame. The magnified virtual image, termed frame image, may be formed at an image plane 360 farther away from the eye box 357 than the display 350. The magnified virtual image is then projected by a lens 311 of the eye 310 onto retina 312 to form an image thereon. Although only a single optics block 320 is shown, HMD 300 may include two instances of this block, one for each eye of the user, and in some embodiments may also include two instances of the electronic display 350. The electronic display 350 may be, for example, a micro-display with a total pixel count that may be smaller than, for example, a pixel count of a conventional direct-view LED or LC TV display. HMD 300 may include one or more light sources 392 to provide light to track the position and movement of the user's eye 310. One or more cameras or photodetectors 391 may be disposed to detect reflections of the eye-tracking light from the user's eye 310. The camera(s) or detector(s) 391 are coupled to a gaze processor block 373 configured to generate a gaze direction signal based on signals from the camera(s) or detector(s) 391. The camera(s) or detector(s) 391, the gaze processor block 373, and the one or more light sources 392 may embody the eye tracking device or system 222 of FIG. 6. The electronic display 350 is a pixelated display that includes an array of display pixels, as described hereinabove. The electronic display 350 may be an embodiment of display 110 of FIG. 6. It may be, for example, an LCD display, an OLED display, an AMOLED display, or any other suitable pixelated display. In some embodiments the electronic display 350 may be configured to emit polarized light. In other embodiments the electronic display 350 may be configured to emit unpolarized light. The electronic display 350 may be operationally coupled to a display processor 370, which may be an embodiment of the display processor 270 described hereinabove with reference to FIGS. 5-8. In operation, the electronic display 350 receives frame data from display processor 370, for example in the form of a sequence of frames 71 or subframes 73 as described hereinabove, and presents corresponding images to the user by selectively exciting a pattern of display pixels at various intensity levels, for example as defined by the subframes 73. The optics block 320 may include one or more optical elements, such as but not exclusively a convex lens, a concave lens, a Fresnel lens, an LC lens, a liquid lens, an aperture, a grating, a filter, a polarizer and/or polarization converter, or any other suitable optical element. These optical elements, or a subset thereof, may form imaging optics of HMD 400. The optics block 320 may be configured to form a magnified image of a frame displayed by the pixel array of the display 350, and may also correct for optical aberrations and other optical errors in the image light received from the electronic display 350.

SRED 360, which may be comprised in the optics block 320, may be an embodiment of SRED 210 described hereinabove. SRED 360 may be in the form, or include, an array of device segments 308, which may be as described hereinabove with reference to the device segments 208 of SRED 210. A SRED controller 380 may be provided to selectively activate one of the device segments 308 located in the gaze direction, in accordance with the gaze direction signal from the gaze detector module 373. The SRED controller 380 may be an embodiment of the SRED controller 232 described hereinabove.

SRED 360 may be positioned at a location in HDM 300 where image light 301 from different display areas are substantially separated in space, so that different device segments 308 are optically coupled to different areas of the pixel array of display 350. Thus portions of image light 301 that pass through different device segments 308 generally originate from different areas of display 350, and therefore from different, mostly non-overlapping, groups of display pixels, as generally described hereinabove with reference to FIG. 7. In some embodiments the imaging optics of the optics block 360 may include optics 321 that may be disposed in the optical path of the image light 301 upstream from SRED 360 that may be configured to at least partially collimate the image light 301 so that light portions originating from different non-overlapping areas of the pixel array of display 350 do not significantly overlap at the location of SRED 360. In some embodiments SRED 360 may be disposed immediately next to the light emitting face 354 of display 350, and may be laminated thereon.

In some embodiments each device segment 308 of SRED 360, or 208 of SRED 210, may be in the form, or include, a light steering switch (LSS) configured to dynamically shift an image of a corresponding portion of the display pixel array of display 350 between two or more spatial positions, in synchronization with the electronic display 360 displaying a sequence of subframes 73, generally as described hereinabove. In at least some embodiments the LSS is configured to switchably impart one or more angular shifts on a portion of the image light 301 it intercepts to locally shift the partial image formed by the intercepted image light. In some embodiments the optical block 320 may include one or more optical elements, such as one or more lenses, that may be disposed downstream of SRED 360, i.e. between SRED 360 and the eye 310. In some embodiments these optical element(s) may be configured to convert the one or more angular shifts to spatial displacements in an image plane.

A memory device or devices 375 may be provided that contain information relating one or more device segments 308 to gaze directions, for example in the form of a LUT. The same or different memory device may also contain information relating device segments to groups of display pixels of display 350, as described hereinabove. The display processor 370 may be configured to render an input image frame 71 to convert it into two or more subframes 73 that are selectively sampled with a sampling offset between subframes in a portion of the subframe that corresponds to the portion of the frame image in the gaze direction, with the sampling offsets matching spatial image shifts imparted by an activated device segment 308, as described hereinabove.

Figure 12A:
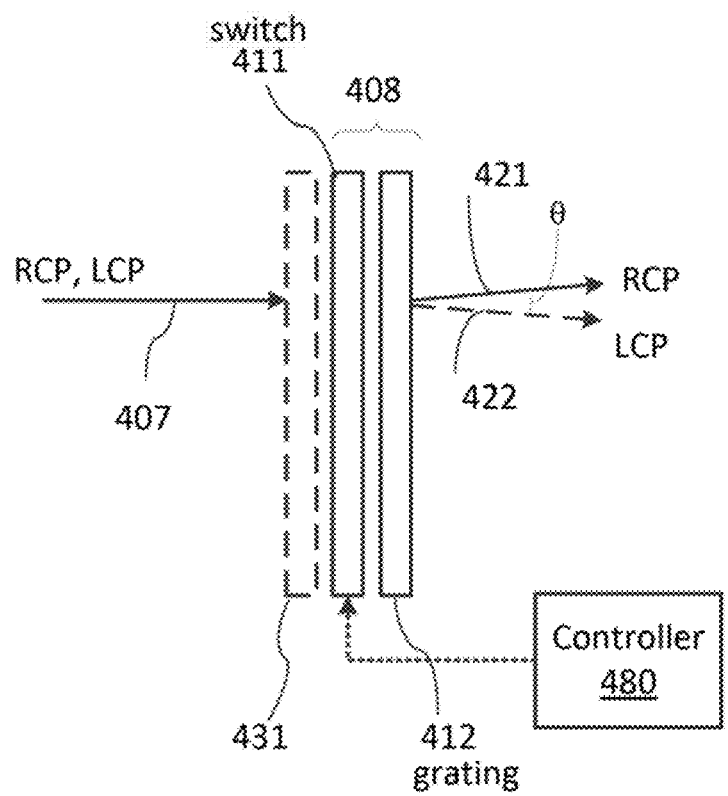
FIG. 12A is a schematic side view of a one-dimensional (1D) light steering switch formed of a polarization switch followed by a polarization grating.

Referring to FIG. 12A, a light steering switch (LSS) 408 may be implemented with a polarization switch (PS) 411 disposed in an optical pass of image light 407 upstream of a polarization directing device 412. The LSS 408 may be an embodiment of one device segment 308 of SRED 360, or may be a portion thereof. The PS 411 is configured to switch image light 107 between a first polarization state S1 and an orthogonal polarization state S2 in response to a control signal from the SRED controller. The polarization directing device 412 is configured to direct the image light it receives in dependence on the polarization state thereof, for example to direct light of the first polarization state S1 in a first direction 421 and to direct light in the second polarization state S2 in a second direction 422, with an angular shift θ therebetween. LSS 408 shifts received light in a single direction, e.g. the direction in the plane of the figure in the illustrated example, resulting in a spatial image shift in a single dimension; accordingly LSS 408 may be referred to as a one-dimensional (1D) LSS.

In some embodiments the polarization directing device 412 may be a polarization grating, for example an LC polarization grating as described hereinabove with reference to FIG. 1C and FIG. 1D. In some embodiments PS 411 may be an active LC HWP, also as described hereinabove with reference to FIGS. 1A and 1B. In some embodiments PS 411 may receive the image light 407 as polarized light in the first polarization state S1, and operate to either transmit it without change or to temporarily switch it to the second polarization state S2. In some embodiments PS 411 may be preceded by a polarization conditioning device 431 that receives the image light 407 and conditions it to the desired input polarization of the polarization switch 411, for example S1. The polarization conditioning device 131 may be for example in the form, or include, a polarizer and/or a polarization converter, such as a waveplate. PS 411 may also be referred to herein as the first polarization switch, and the polarization grating 412 may also be referred to herein as the first polarization grating.

In some embodiments the image light 407 received by PS 411 is circular polarized, and PS 411 is in the form of an active LC HWP that can switch between an ON state and an OFF state, in one of which PS 411 transmits the image light "as is" and in the other it switches input circular polarization to the circular polarization of the opposite handedness. In embodiments wherein display 350 emits unpolarized light, the polarization conditioning element 431 may be a circular polarizer, for example in the form of a linear polarizer followed by a QWP. In embodiments wherein display 350 emits linearly polarized light, the polarization conditioning element 431 may be in the form of a polarization converter such as a suitably oriented QWP, for example an LC QWP.

The polarization grating 412 may be for example an LC PBP grating, and may be configured to deflect RCP light by a diffraction angle $\theta_d$ while converting it to LCP light, and to deflect LCP light in the opposite direction, generally by the same diffraction angle $\theta_d$ and in a same plane, while converting it to RCP light, for example as described hereinabove with reference to FIGS. 1A-1D. In embodiments describe herein the polarization grating 412 may be configured so that the diffraction angle $\theta_d$ is small, for example about 0.001-0.2 degrees, and preferably in the range of 0.01 to 0.1 degrees. In embodiments wherein the polarization grating 412 is a passive LC polarization grating, LSS 408 may be a 2-state device that is operable to form two image pixels for each display pixel over a sequence of two subframes, which enables increasing the effective image resolution by up to two times with an effective frame rate of R/2.

In some embodiment the polarization grating 412 may be an active LC polarization grating that is switchable between an ON state and an OFF state, and which operates as a simple transmissive element in one of these states, as described hereinabove with reference to FIGS. 1A-1D. In such embodiment LSS 408 may be a 3-state device that is operable to form three image pixels for each display pixel over a sequence of three subframes, which enables increasing the effective image resolution by up to three times with an effective frame rate of R/3.

The direction in which the image light 407 is steered by LSS 408, and thus the direction of the image shift s relative to the pixel rows and columns in the image, depends on the rotational orientation of the polarization grating 412 about its optical axis, and may be changed by suitably rotating polarization grating 412. In various embodiments the direction of the image shift s may be aligned with either rows or columns of the image pixel array, or may not be aligned with either.

Figure 12B:
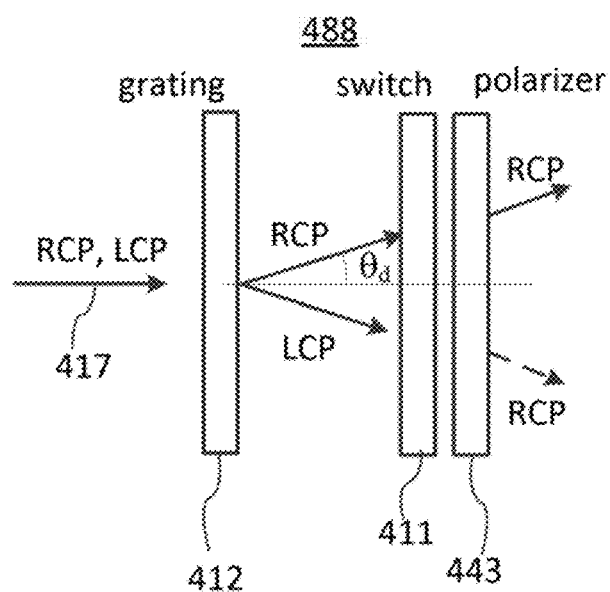
FIG. 12B is a schematic side view of a one-dimensional (1D) light steering switch formed with a polarization grating followed by a polarization switch.

Referring to FIG. 12B, some embodiments may utilize an LSS 488 in which the polarization grating 412 is disposed upstream from the PS 411, which may be optically followed by a polarizer 443. For example the polarization grating 412 may be an LC PBP grating, PS 411 may be an active LC HWP, and the polarizer 443 may be a CP polarizer that transmits only one of LCP light or RCP light, while blocking the other. LSS 488 may operate as a directional switch/polarizer for unpolarized or linearly polarized light 417. For example the LC PBP grating 412 may split unpolarized light 417 into RCP and LCP components, diffracting the RCP light at a diffraction angle $+\theta_d$ and the LCP light at a diffraction angle $-\theta_d$. The CP polarizer 443 may be for example transmissive to the RCP light while blocking LCP light, or vice versa. The PS 411 is switchable between a first state where it has zero retardance, and a second state in which it has the half-wave retardance. In the first state of PS 411, LSS 488 outputs the RCP light at a the diffraction angle $+\theta_d$. In its second state LSS 488 flips the polarization states of the RCP and LCP light diffracted by grating 412, and outputs RCP light at a the diffraction angle $-\theta_d$.

Figure 13:
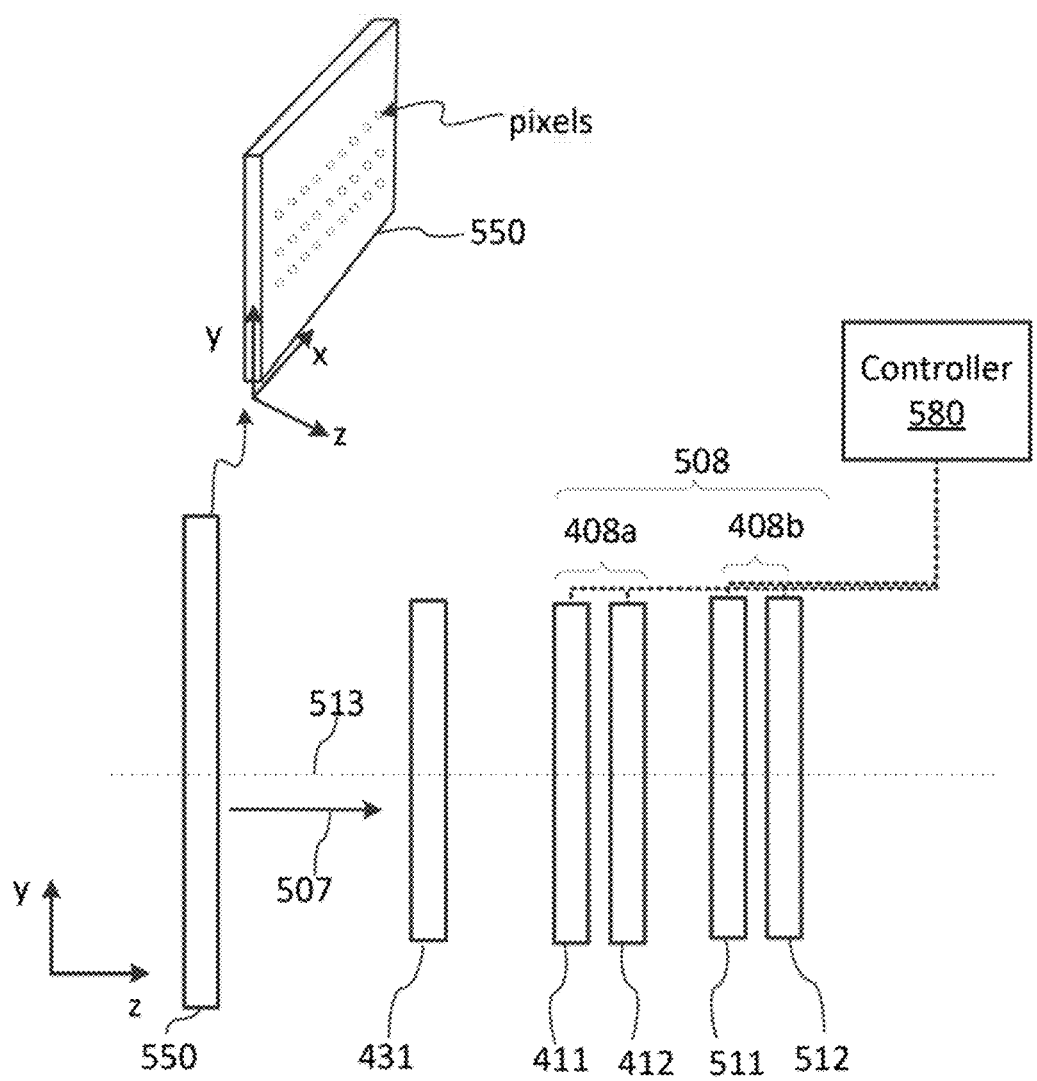
FIG. 13 is a schematic side view of a 2D light steering switch formed with two rotationally offset polarization gratings in sequence.

Referring to FIG. 13, the total number of image pixels that may be obtained from each pixel of an electronic display may be increased by using two or more polarization gratings in sequence, for example by stacking several instances of LSS 408 one after another, in some embodiments with a rotation. In the illustrated embodiment an LSS stack 508 includes two instances of an LSS 408 illustrated in FIG. 12A disposed in sequence, a first LSS 408a and a second LSS 408b. The LSS stack 508 may embody one device segment of SRED 360. FIG. 13 also schematically shows an electronic display 550, both in cross-section and in an isometric view in an insert, and a SRED controller 580. The LSS stack 508 may be switched between a greater number of angular shifts than LSS 408, resulting in a more dense or diverse constellation of image pixels that may be obtained from a single display pixel. The LSS stack 508 receives image light 507 from the electronic display 550, which may be similar to the electronic displays 110 and 350 of FIGS. 5 and 9. A polarizer or polarization converter 431 may be provided to convert image light 507 from the display 550 to polarized light, for example into LCP or RCP light. The first LSS 408a includes a first polarization grating 412 disposed in sequence with a first PS 411. The second LSS 408b includes a second polarization grating 512 disposed in sequence with a second PS 511. The second polarization grating 512 may be disposed with a rotational offset about an optical axis 513 relative to the first polarization grating 412, for example 90°+\−10°, so that the LSS 408a and 408b impart angular shifts upon image light in two different planes. Accordingly, the LSS stack 508 may be referred to as a 2D LSS. Each of the first and second LSS 408a, 408b may be either a 2-state device or a 3-state device, depending on whether it includes an active polarization grating or a passive polarization grating. Accordingly, in various embodiments the LSS stack 410 may be configured to be switchable between 4, 6, or 9 different states.

TABLE 1

| Sub-Frame # | PS1 | PG1 | PS2 | PG2 | angle |
|---|---|---|---|---|---|
| 1 | off | off | off | on | $+\theta_x$ |
| 2 | on | Off | Off | on | $-\theta_x$ |
| 3 | off | On | Off | off | $+\theta_y$ |
| 4 | on | On | Off | off | $-\theta_y$ |
| 5 | off | On | On | On | $+\theta_x,+\theta_y$ |
| 6 | off | On | Off | on | $+\theta_x,-\theta_y$ |
| 7 | on | On | Off | on | $-\theta_x,+\theta_y$ |
| 8 | on | On | On | on | $-\theta_x,-\theta_y$ |
| 9 | off/on | off | Off/on | off | 0 |

Table 1 illustrates 9 different switching states of an example embodiment of the LSS stack 508 with two active LC polarization gratings. In this embodiment each of the first and second PS 411, 421 is a voltage-controlled active LC HWP that has a half wave retardance in the absence of voltage, i.e. in the OFF state, and has a substantially zero retardance in an ON state when a suitable voltage is applied. Each of the first and second polarization gratings 421, 512 is an electrically-controlled active LC PBP grating, which in the ON state, i.e. when a voltage is applied thereto, may operate as a simple transmissive element that neither deflects light nor discriminates between polarizations. The first polarization grating 412 may be oriented to deflect light in the (x,z) plane by an angle $\pm\theta_x$ when turned off, which may result in an image displacement by $+\backslash-s_x$ in a display system. The second polarization grating 512 may be oriented to deflect light by an angle $\pm\theta_y$ in the (y,z) plane when turned off, resulting in an image displacement by $+\backslash-s_y$ in an orthogonal dimension. The deflections angles $\theta_x$ and $\theta_y$ are independently controlled by the design of the respective LC polarization gratings 412, 512 and may be either equal or different, depending on a particular system implementation and the geometry of the pixel array of the display 550. In other embodiments with different LC materials the actions of the active LC elements 411, 412, 511, 512 in the ON and OFF states may be reversed. A controller 463 may be provided that is in an electrical communication with each of the active LC elements 411, 412, 511, 512, and is configured for switching each of them ON and OFF in any desired order. The controller 580 may be an embodiment of the SRED controllers 232 or 380 described hereinabove, and may be configured to active the LSS stack 508 to switch synchronously with display 550 refreshing to display a next subframe. In Table 1, PS1 and PS2 indicate the first PS 411 and the second PS 511 respectively, and PG1 and PG2 indicate the first polarization grating 412 and the second polarization grating 422, respectively.

Figure 14:
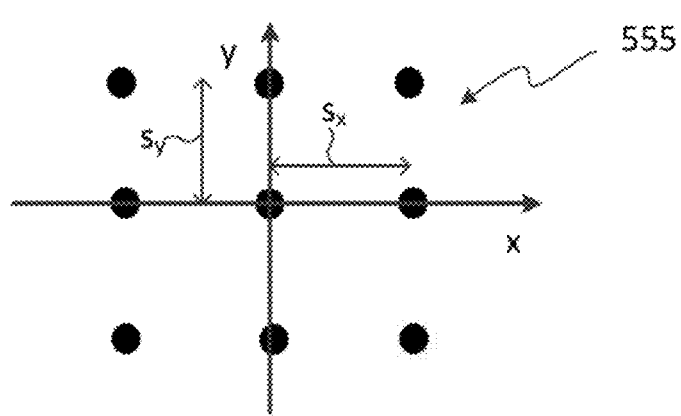
FIG. 14 is a schematic diagram of a constellation of image pixels that may be obtained from one display pixels with the 2D light steering switch of FIG. 13.

By switching the LSS stack 508 between these 9 states indicated in Table 1, image light from a corresponding area of display 550 may be directed at any one of the nine different deflection angles listed in the last column of Table 1, so that the corresponding area of the displayed frame may be imaged or projected at up to nine slightly different locations in an image plane of the display system in which it is used, such as HMD 300. Cycling between these 9 states results in a constellation 555 of 9 image pixels for each display pixel of the corresponding display area, as indicated in FIG. 14. It will be appreciated that the subframes in the first column of Table 1 are numbered in no specific order, and the sequence of switching may be different than that indicated in Table 1.

Polarization gratings 412, 512 may be configured for each specific configuration of the display system to provide the deflection angles $\theta_x$, $\theta_y$ for which the constellation of the image pixels of FIG. 14 has a desired size in an image plane of the display system. By way of example, each of the deflection angles $\theta_x$, $\theta_y$ may be in the range from about 0.001 to 0.2 degrees. In embodiments wherein one or both of the displacements $s_x$, $s_y$ is a fraction of a pixel pitch in a corresponding direction in the image plane, the displacement may place some or all of the image pixels of the corresponding portion of one subframe 73 in the dark interstitial spaces of a preceding subframe 73. Cycling through these 9 displacements, or a subset thereof, for each high-resolution input frame 71 may enable up to 9 times higher effective image resolution in the portion of the frame image in the gaze direction, with an effective frame rate of R/9.

By way of example, in one embodiment each of the deflection angles $\theta_x$, $\theta_y$ may be selected so that each of the displacements $s_x$, $s_y$ is about one third of a pixel pitch in the corresponding direction, i.e. $s_x=p_x/3$ and $s_y=p_y/3$, so that the image pixel constellations 555 corresponding to adjacent display pixels do not overlap. This enables increasing effective image resolution in the gaze direction by a factor of 9 relative to image areas in the vision periphery where the frame image may remain stationary over consecutive subframes. In other embodiments cycling the LSS stack 508 between the 9 possible states, or a selected subset of these states, may temporally cause a pixel image to overlap with an adjacent pixel image in a subsequent subframe, thereby providing pixel redundancy and enabling corrosion of defective pixels.

Figure 15:
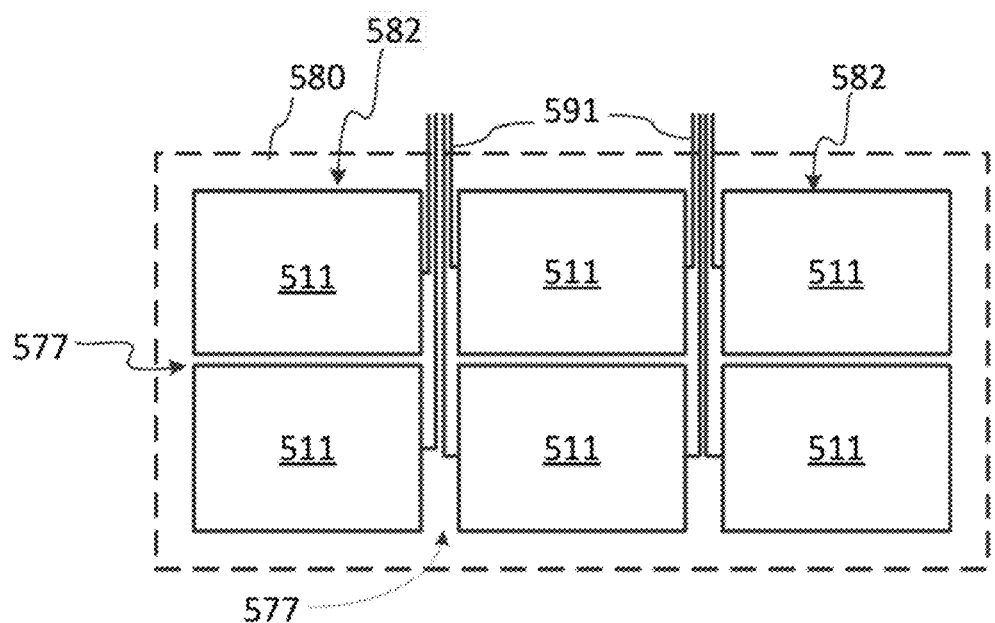
FIG. 15 is a top view of a segmented active LC device.

With reference to FIG. 15, a SRED that is composed of device segments in the form of light steering switches of the type illustrated in FIGS. 10A-11 may be implemented using one or more active LC polarization gratings with at least one of their optically-transparent electrodes segmented into an array of independently addressable electrode segments, and/or one or more active LC retarders with correspondingly segmented electrodes. Generally only one of two electrodes of an active LC waveplate or grating needs to be segmented. FIG. 15 schematically shows a top view of an active LC waveplate or grating 580 with its top ITO electrode patterned with gaps 577 to form a square array of electrode segments 511 that are electrically separated from each other. Electrical lines 591 may be provided in the gaps to enable applying voltage independently to each ITO electrode segment 511. Each electrode segment 511 defines an underlying LC segment 582 that can be turned ON or OFF independently. Although FIG. 15 shows a 3×2 array of LC segments for the purposes of illustration, a greater number of LC segments 582 may be formed. Generally, a SRED may include an $N_s \times M_s$ array of individually addressable LC segments 582, with any desired number $N_s$, $M_s$ of segment rows and columns. By way of example, a SRED in a display system with a field of view of 180° in both the vertical and horizontal dimensions may include a 9×9 array of device segments to provide a $+\backslash-10°$ solid angle of vision acuity.

A SRED with device segments in the form of 1D LSSs of the type illustrated in FIG. 12A or 12B may be implemented with an LC stack composed of a passive or active LC grating and a segmented active LC retarder, or an active segmented LC grating and an active LC retarder. A SRED with the device segments in the form of 2D LSSs of the type illustrated in FIG. 13 may be implemented, for example, with an LC stack composed of two passive or active LC gratings and two segmented active LC retarders with matching segment arrays, or two segmented active LC gratings with matching segment arrays and two active LC retarders, among other possible combinations of segmented or non-segmented active LC retarders, segmented active LC gratings, and non-segmented active or passive LC gratings.

Figure 16:
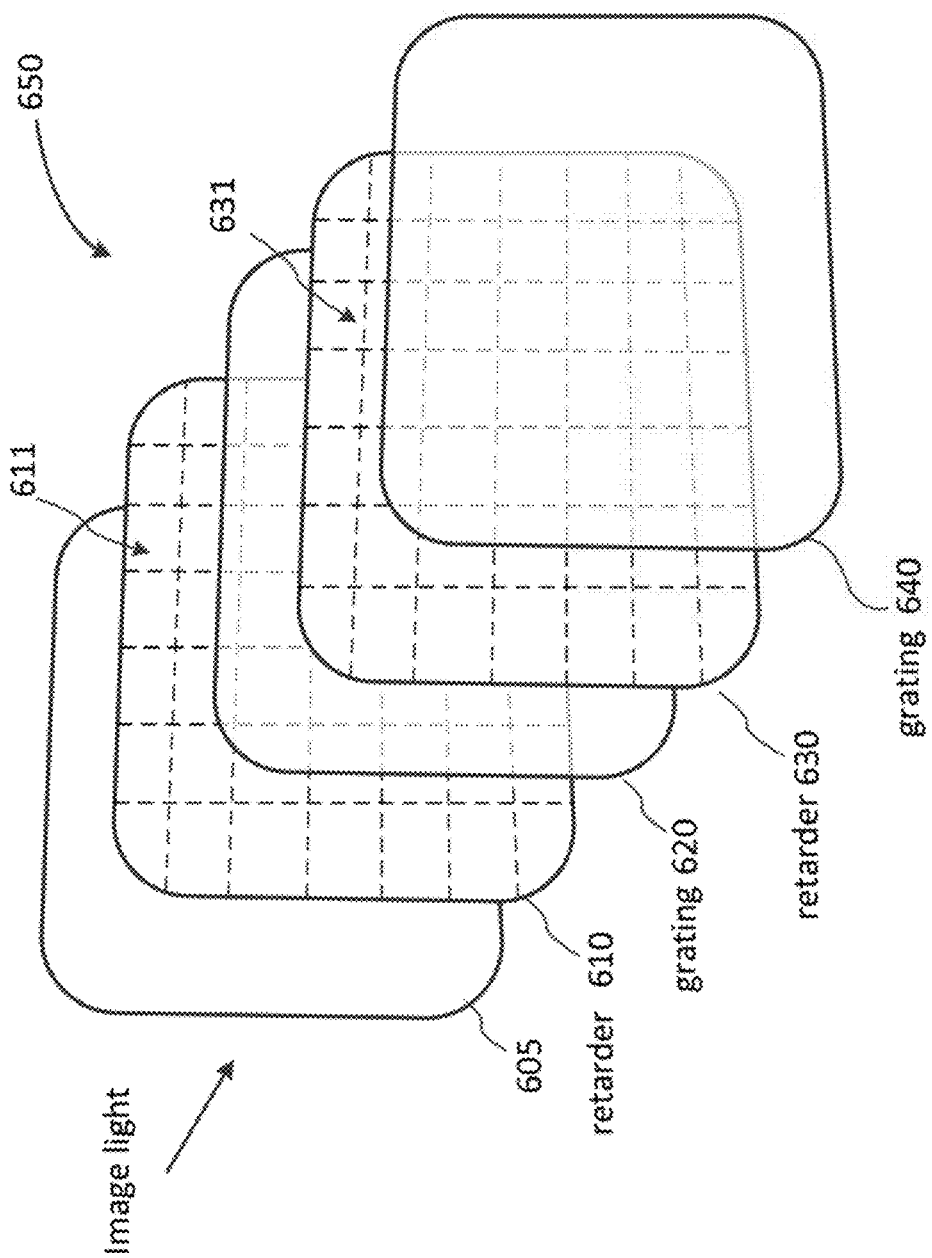
FIG. 16 is a schematic isometric view of an example embodiment of a segmented 2D light steering LC switch.
Figure 17:
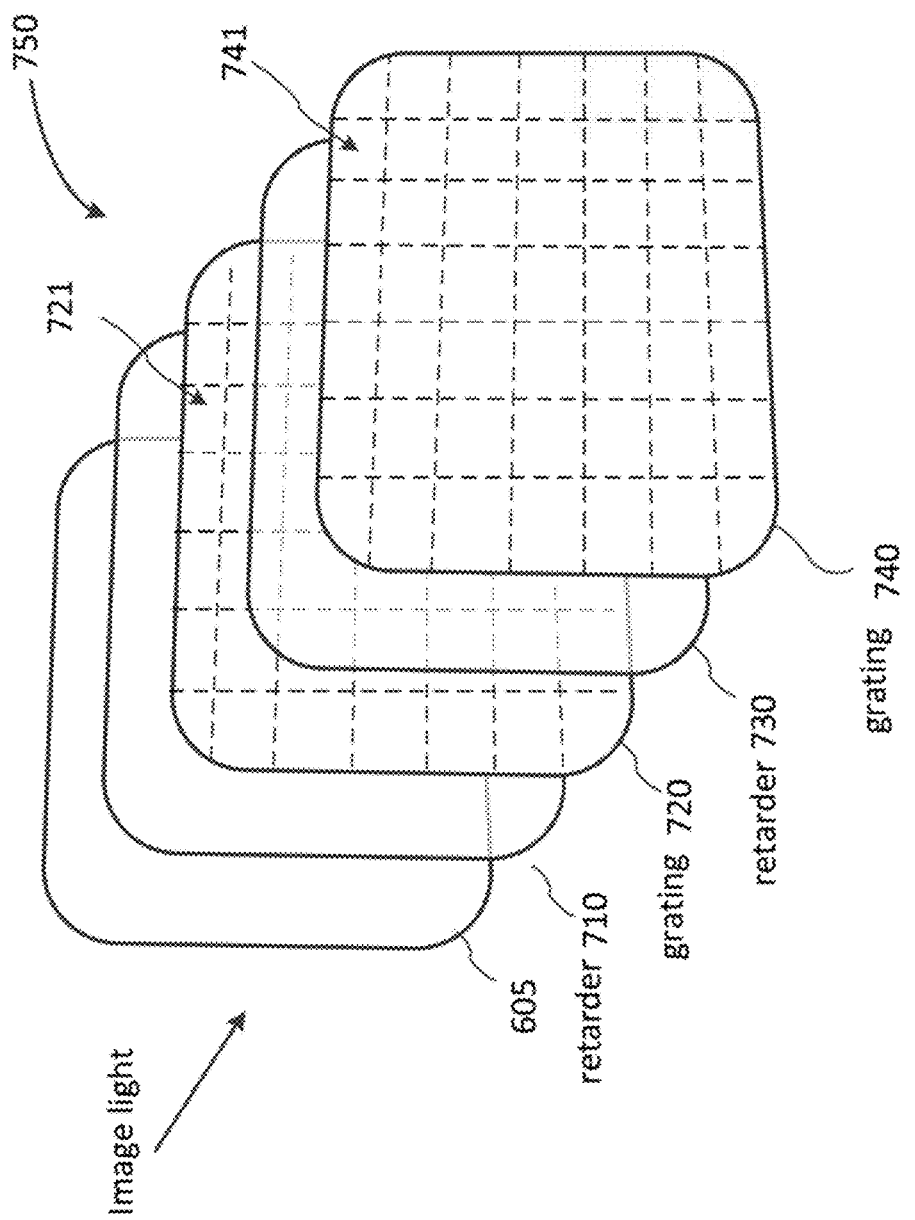
FIG. 17 is a schematic isometric view of another example embodiment of a segmented 2D light steering LC switch.

FIGS. 16 and 17 schematically illustrate two example implementations of a SRED in the form of an LC stack that includes two LC polarization gratings, 620 and 640 in FIGS. 16 and 720 and 740 in FIG. 17, and two active LC retarders as polarization switches, 610 and 630 in FIGS. 16 and 710 and 730 in FIG. 17. FIG. 16 illustrates a SRED 650 wherein the active LC retarders 610, 630 are segmented with matching arrays of LC segments, while FIG. 17 illustrates a SRED 750 wherein the active LC polarization gratings 720, 730 are segmented with matching arrays of LC segments.

Each of these embodiments may include a polarization device or devices 605 at its input, such as a polarizer, a waveplate or a polarization controller, to condition image light to a desired polarization, as appropriate for the polarization gratings of the stack. In each of the embodiments shown in FIGS. 16 and 17, the active or passive LC gratings may be in the form of an LC PBP grating or a volume LC holographic grating. When the polarization gratings are LC PBP gratings and image light incident upon the SRED is linearly polarized, the polarization device 605 may be in the form of a suitably aligned QWP, for example an LC QWP, and may be the first element of the LC stack. When image light incident upon the SRED is unpolarized, the polarization device 605 may be in the form of a linear polarizer followed by a suitably aligned QWP, or any other device configured to transform unpolarized light into CP polarized light.

In the embodiment of FIG. 16 each segment 611 of the first active LC retarder 610 is optically aligned with a corresponding segment 631 of the second active LC retarder 630, defining one device segment of SRED 650, or one independently controllable LSS. In the embodiment of FIG. 17 each segment 721 of the first LC grating 720 is optically aligned with a corresponding segment 741 of the second LC grating 740, defining one device segment of SRED 750, or one independently controllable LSS. When used in an eye-acuity display system such as that illustrated in FIG. 6 or FIG. 11, these device segments may be selectively activated by a SRED controller to cycle through their light steering states, thereby selectively enhancing an effective resolution of the displayed image in the gaze direction for the viewer. The device segments away from the gaze direction may remain in a default state.

The embodiment of FIG. 17 with active segmented LC PBP gratings 720, 740 enables an effective resolution enhancement in the gaze direction by up to a factor of 9 relative to the image resolution in the peripheral vision. By way of example, if the actual pixel density of a display is 3K by 3K, the effective image resolution in the gaze direction, i.e. the resolution of the portion of the display viewed via the activated device segments, may be 9K by 9K. The embodiment of FIG. 16 with active non-segmented LC PBP gratings 620, 640 and active segmented retarders 610, 620 enables an effective resolution enhancement in the gaze direction by up to a factor of 9, while also enabling an effective image resolution enhancement in the peripheral vision by up to 4 times. The embodiment of FIG. 16 with passive non-segmented LC PBP gratings 620, 640 and active segmented retarders 610, 620 enables an effective resolution enhancement in the gaze direction by up to a factor of 4. Table 2 summarizes effective resolution enhancement factors for five example configurations of an LSS stack with two retarders and two LC PBP gratings.

In some embodiments of an LSS stack, the retarders may be disposed downstream of the gratings. When used in a display system such as those illustrated in FIG. 6, FIG. 11, or FIG. 13, in some embodiments an LSS stack, such as the LLS stacks 650 or 750, may be placed next to the electronic display emitting the image light, and may be laminated onto the display.

TABLE 2

| Resolution Enhancement Factor | | LC Retarders | | LC Polarization Gratings | |
|---|---|---|---|---|---|
| Surrounding region | Gazed region | Active/ Passive | Segmented? | Active/ Passive | Segmented? |
| 1 | 9 | Active | Yes | Active | Yes |
| 1 | 4 | Active | Yes | Passive | No |
| 4 | 9 | Active | Yes | Active | No |
| 1 | 9 | Active | No | Active | Yes |
| 1 | 4 | Passive | No | Active | Yes |

Broad-Band and Off-Axis/Oblique Angle Operation

Figure 18:
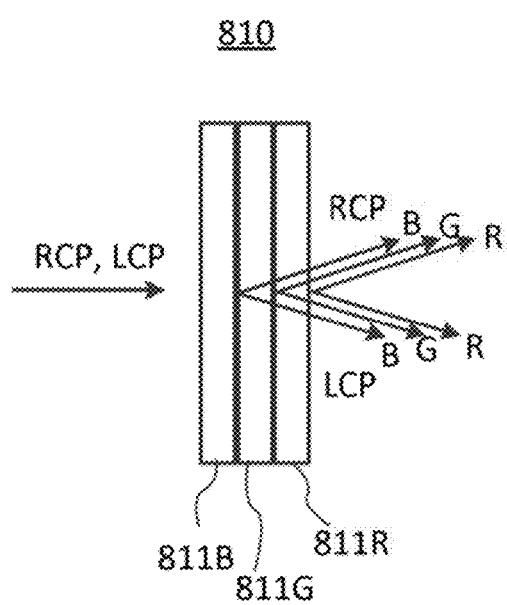
FIG. 18 is a schematic diagram of an LC PBP gratings with reduced wavelength sensitivity.

In some embodiments, the polarization devices described herein may be modified to reduce their wavelength dependence. Generally the retardance of the LC layer of an LC waveplate or an LC polarization grating is wavelength-dependent; thus, LC retarders and gratings described hereinabove that are designed to operate, for example, in one wavelength band of the display light, may not operate optimally for another wavelength band that may be present in the display light. Accordingly, in some embodiments the example light steering switches and SREDs described hereinabove may be modified to reduce variations of their performance across a desired spectral range, such as in the visible spectrum. In such embodiments each of the light steering devices shown in FIGS. 10-15 may be composed of two or more groups of LC devices, each designed to operate as a target waveplate or polarization grating in one wavelength sub-band or color channel, and be simply transmissive in one or more others wavelength sub-bands or color channels. For example, in embodiments where the electronic display emit RGB light composed of red (R), green (G), and blue (B) color channels, a light steering switch with a reduced sensitivity to the wavelength may then include a stack of three active or passive LC PBP gratings. As illustrated in FIG. 18 by way of example, an LC polarization grating stack 810 with a reduced wavelength sensitivity may include a first LC PBP grating 811B having a retardance of odd number of half-wavelengths of blue color channel to operate as a HWP for B light but as an nWP for the G and R light, a second LC PBP grating 811G having a retardance of odd number of half-wavelengths of green color channel to operate as a HWP for G light but as an nWP for the R and B light, and a third LC PBP grating 811R having a retardance of odd number of half-wavelengths of red color channel to operate as a HWP for the R light but as an nWP for the G and B light. At other color channels, the LC PBP gratings 811B, 811G, and 811R may have a retardance of even number of half-wavelengths and thus do not steer light or change its polarization. In this configuration, the first LC PBP grating 811B diffracts the B light by a polarization dependent angle, while transmitting the G and R light without change in direction; the second LC PBP grating 811G diffracts the G light by the same polarization dependent angle, while transmitting the B and R light without change in direction; the third LC PBP grating 811R diffracts the R light by the same polarization dependent angle, while transmitting the G and the B light without change in direction. In other embodiments the LC grating stack 810 may have a same or different number of LC gratings designed for other wavelength bands. Similarly, an active LC HWP in front of an LC grating or an LC grating stack in an LSS or SRED may be composed of three color-specific LC HWPs, each designed to operate as an nWP for the color bands other than its target color band.

Furthermore, generally the polarization performance of LC devices may depend on the angle of incidence, with the device retardance typically being reduced for light that is incident at an oblique angle. Accordingly, in some embodiments the LC retarders and/or LC polarization gratings described hereinabove may include additional birefringent plates or retardation sheets, such as C-plates, which retardance increases at oblique angles of incidence, thereby reducing or eliminating the dependence of the performance of the respective polarization device on the angle of incidence of image light.

Figure 19:
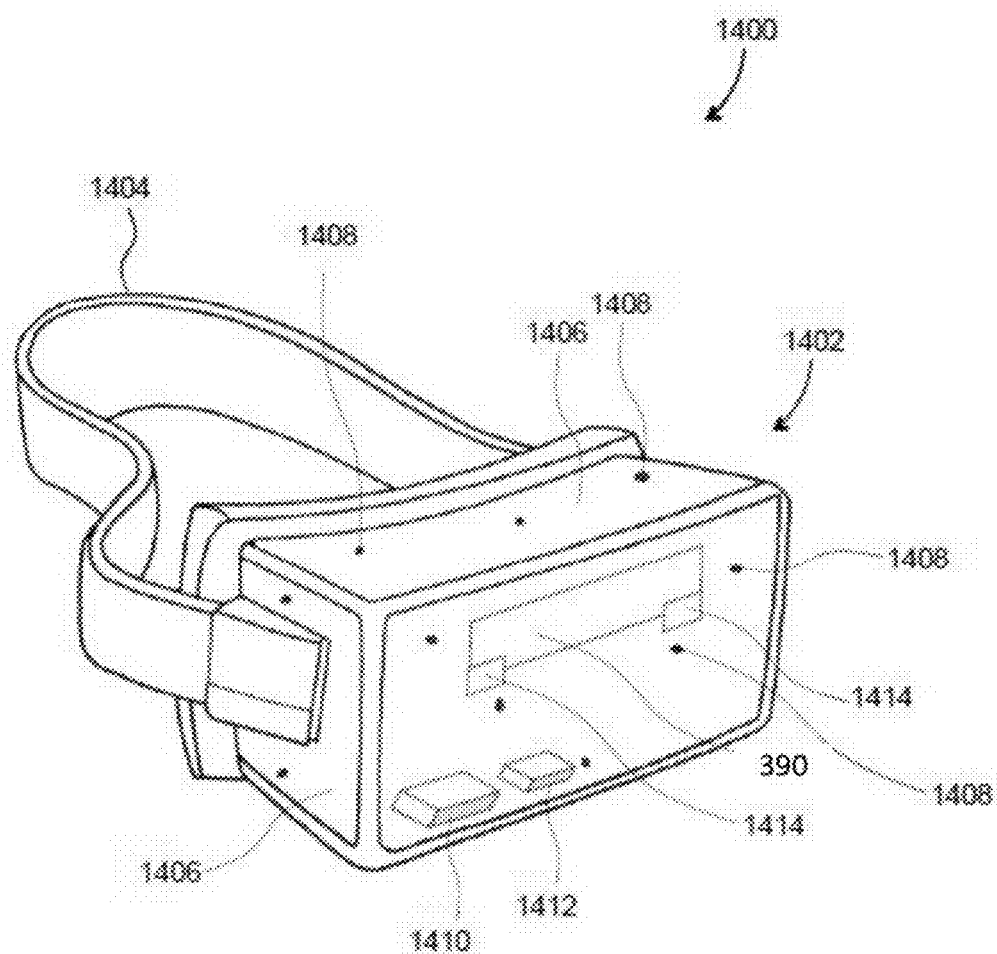
FIG. 19 is an isometric view of an example eye-acuity HMD.

Turning now to FIG. 19, a head-mounted display (HMD) 1400 may include a SRED or SREDs and/or eye-acuity display module(s) described above. The HMD 1400 may provide content to a user as a part of an artificial reality system. The HMD 1400 may augment views of a physical, real-world environment with computer-generated imagery and/or to generate an entirely virtual 3D imagery. The HMD 1400 may include a front body 1402 and a head band 1404. The front body 1402 is configured for placement in front of eyes of a user, and the head band 1404 may be stretched to secure the front body 1402 on the user's head.

In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space.

A display module, such as the eye-acuity display module 390 of FIG. 11, may be disposed in the front body 1402 for presenting imagery to the user. The eye-acuity display module 390 is shown in FIG. 16 as an illustration only, and other types of display modules incorporating a SRED of this disclosure may be used. Sides 1406 of the front body 1402 may be opaque or transparent. The HMD 1400 may further include an eye tracking system 1414, which determines orientation and position of user's eyes in real time. The obtained position and orientation of the eyes allows the HMD 1400 to determine the gaze direction of the user and to enhance the effective resolution of image generated by the display module 390 in the gaze direction. In some embodiments, a selected segment of a SRED or SREDs in the gaze direction is activated to provide a resolution enhancement and/or pixel defect correction in the gaze direction.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. For example, in some embodiments at least a portion of the imaging optics may be disposed optically downstream of the beam steering device. Furthermore, although in example embodiments described hereinabove the SRED is shown to operate in transmission, display system embodiments with a SRED operating in reflection may also be envisioned.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:
    an electronic display comprising a pixel array configured to display a frame, the pixel array comprising a plurality of display pixels;
    an eye tracking device configured to determine a gaze direction of a user of the electronic display; and,
    an optical block for forming a frame image from the frame displayed by the electronic display, the optical block comprising a segmented resolution enhancing device (SRED) disposed in an optical path of light from the display pixels and operatively coupled to the eye tracking device, the frame image comprising an array of image pixels disposed at an image pixel pitch p;
    wherein the SRED comprises a plurality of device segments configured to be individually activated in response to a signal from the eye tracking device, each device segment being optically coupled to a different group of display pixels of the pixel array, for selectively enhancing effective resolution for a portion of the frame image in the gaze direction;
    wherein each device segment from the plurality of device segments comprises a light steering switch (LSS) configured to switch, upon activation in response to the signal, between two or more light steering states while the frame is being displayed, so as to provide a sequence of offset images for the portion of the frame image in the gaze direction.

2. The apparatus of claim 1 comprising a controller configured to activate a selected device segment in the gaze direction from the array of device segments based on the signal from the eye tracking device.

3. The apparatus of claim 2 comprising a display processor configured to:
    provide pixel data to the electronic display for displaying the frame;

identify a selected group of display pixels, from the different groups of display pixels of the electronic display, that is optically coupled to the selected device segment; and, perform a selective pixel update of the selected group of pixels with new pixel data at least once while the frame is being displayed by the electronic display.

4. The apparatus of claim 3 wherein the selective pixel update is performed without updating a peripheral group of display pixels located outside of the selected group of display pixels with new pixel data while the frame is being displayed.

5. The apparatus of claim 1 wherein the selective pixel update is performed in coordination with switching the LSS of the selected device segment.

6. The apparatus of claim 5 wherein the LSS is operable, upon activation by the controller, to provide the sequence of mutually offset images comprising two images having a spatial offset s therebetween equal to a fraction of the image pixel pitch p.

7. The apparatus of claim 6 wherein the frame image comprises interstitial areas between adjacent image pixels that are at least equal to the image pixels in size, and wherein the spatial offset s is such that at least some of the image pixels of a first of the two mutually offset images are located in the interstitial spaces of the second of the mutually offset images.

8. The apparatus of claim 6 wherein the display processor is configured to selectively sub-sample input frame data for the selected group of display pixels at two or more sampling grids with a sampling offset therebetween matching the spatial offset s.

9. The apparatus of claim 1 wherein the SRED comprises:
a first polarization grating, and
a first polarization switch disposed in sequence with the first polarization grating,
wherein at least one of the first polarization grating or the first polarization switch comprises a plurality of first individually addressable segments defining the plurality of device segments, and
wherein at least one of the electronic display or the optics block comprises a polarization element configured to provide polarized pixel light from the electronic display to the SRED.

10. The apparatus of claim 9 wherein the electronic display is configured to transmit polarized light.

11. The apparatus of claim 9 comprising polarization device disposed optically between the electronic display and the SRED and configured to provide light from the electronic display to the SRED in a circular polarization state.

12. The apparatus of claim 9 wherein at least one of the first polarization switch or the first polarization grating comprises an active LC device comprising an LC layer disposed between two electrodes, at least one of which is transparent, and wherein at least one of the two electrodes comprises a plurality of electrically separate electrode segments.

13. The apparatus of claim 9 wherein the SRED further comprises a second polarization grating disposed in sequence with a second polarization switch, and wherein at least one of the second polarization grating or the second polarization switch comprises a plurality of second individually addressable segments matching the first individually addressable segments of the at least one of the first polarization grating or the first polarization switch.

14. The apparatus of claim 13 wherein the second polarization grating is disposed with a rotational offset relative to the first polarization grating.

15. The apparatus of claim 13 wherein the rotational offset is substantially 90°.

16. The apparatus of claim 13 wherein at least one of the first polarization grating or the second polarization grating comprises at least one of: a liquid crystal (LC) Pancharatnam Berry Phase (PBP) grating or an LC volume holographic grating.

17. The apparatus of claim 13 wherein at least one of the first polarization grating or the second polarization grating comprises at least one of: a segmented active liquid crystal LC PBP grating, or a segmented active LC holographic grating.

18. The apparatus of claim 13 wherein at least one of the first polarization switch or the second polarization switch comprises an active liquid crystal (LC) half-wave plate (HWP).

* * * * *